(12) United States Patent
Kashiwagi

(10) Patent No.: US 8,040,470 B2
(45) Date of Patent: Oct. 18, 2011

(54) METHOD FOR PRODUCING PARTITION WALL FOR COLOR FILTER, SUBSTRATE WITH PARTITION WALL FOR COLOR FILTER, COLOR FILTER FOR DISPLAY ELEMENT, AND DISPLAY DEVICE

(75) Inventor: Daisuke Kashiwagi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 297 days.

(21) Appl. No.: 12/097,452

(22) PCT Filed: Dec. 12, 2006

(86) PCT No.: PCT/JP2006/324738
§ 371 (c)(1),
(2), (4) Date: Jun. 13, 2008

(87) PCT Pub. No.: WO2007/069593
PCT Pub. Date: Jun. 21, 2007

(65) Prior Publication Data
US 2009/0231521 A1    Sep. 17, 2009

(30) Foreign Application Priority Data
Dec. 16, 2005 (JP) ................. 2005-363440

(51) Int. Cl.
*G02F 1/1335* (2006.01)
*G02F 1/13* (2006.01)
(52) U.S. Cl. ...................... 349/106; 349/187
(58) Field of Classification Search .............. None
See application file for complete search history.

(56) References Cited

U.S. PATENT DOCUMENTS

| | | | | |
|---|---|---|---|---|
| 6,450,635 | B1 * | 9/2002 | Okabe et al. ................ | 347/106 |
| 7,250,236 | B2 * | 7/2007 | Li et al. ........................ | 430/7 |
| 2003/0171059 | A1 * | 9/2003 | Kawase et al. ............... | 445/24 |

FOREIGN PATENT DOCUMENTS

| | | |
|---|---|---|
| JP | 61-99102 A | 5/1986 |
| JP | 1-152449 A | 6/1989 |
| JP | 6-347637 A | 12/1994 |
| JP | 7-35915 A | 2/1995 |
| JP | 08-227012 A | 9/1996 |
| JP | 10-142418 A | 5/1998 |
| JP | 10-186124 A | 7/1998 |
| JP | 2003-172817 A | 6/2003 |

* cited by examiner

*Primary Examiner* — Tina Wong
(74) *Attorney, Agent, or Firm* — Sughrue Mion, PLLC

(57) ABSTRACT

The invention provides a method for producing a partition wall for a color filter having: forming a photosensitive resin layer containing a radical polymerizable monomer, a photopolymerization initiator, a binder and a colorant on at least one surface of a substrate; and exposing the photosensitive resin layer to light at an illumination intensity of 50 mW/cm$^2$ or more in a pattern shape and developing the photosensitive resin layer to form a partition wall that separates color pixel portions, wherein liquid droplets are applied to form the color pixel portions. The invention further provides a substrate having the partition wall for a color filter, a color filter for display element having the substrate and color pixel portions, a method for producing the color filter, and a display device having the color filter for a display element and a method for producing the display device.

12 Claims, 2 Drawing Sheets

FIG. 2A

| R | G | B | R | G | B |
|---|---|---|---|---|---|

| G | B | R | G | B | R | G |
|---|---|---|---|---|---|---|

| R | G | B | R | G | B |
|---|---|---|---|---|---|

| G | B | R | G | B | R | G |
|---|---|---|---|---|---|---|

| R | G | B | R | G | B |
|---|---|---|---|---|---|

FIG. 2B

| R | G | B | R | G | B | R |
|---|---|---|---|---|---|---|
| R | G | B | R | G | B | R |
| R | G | B | R | G | B | R |
| R | G | B | R | G | B | R |
| R | G | B | R | G | B | R |

METHOD FOR PRODUCING PARTITION WALL FOR COLOR FILTER, SUBSTRATE WITH PARTITION WALL FOR COLOR FILTER, COLOR FILTER FOR DISPLAY ELEMENT, AND DISPLAY DEVICE

TECHNICAL FIELD

The present invention relates to a method for producing a partition wall for a color filter, a substrate with a partition wall for a color filter, a color filter for a display element, and a display device. More specifically, the present invention relates to a method for producing a partition wall for a color filter by carrying out pattern formation by exposure, and a substrate with a partition wall for a color filter obtained by using the method, a color filter for a liquid crystal display element, and a liquid crystal display device.

BACKGROUND ART

A color filter for a display device has a configuration in which, for example, dot-like images with red (R), green (G), blue (B) colors or the like are arranged in a matrix shape, and the dot-like images are separated from one another by separation walls such as a black matrix or the like.

Conventionally, known methods for producing color filters include (1) a dying method, (2) a printing method, (3) a method in which a colored pattern image (colored resist method; for example, see Patent Document 1) is formed by coating, exposing and developing a colored photosensitive resin solution, (4) a method in which pattern images formed on a temporary support are sequentially transferred onto an end or temporary substrate, and (5) a method in which a colored photosensitive layer is previously formed by coating a colored photosensitive resin liquid on a temporary support, and the colored photosensitive layer is transferred onto an end or temporary substrate, and is then exposed and developed to form a colored pattern image (transfer method) (for example, see Patent Document 2). Further, methods using an inkjet method have also been known (for example, see Patent Document 3).

Among these methods, the colored resist method enables forming a color filter with high positional accuracy, but is not favorable in terms of cost because of large losses with respect to the coating of the photosensitive resin liquid. Further, although the inkjet method is favorable in terms of cost because of small losses with respect to the resin liquid, the inkjet method is apt to cause difficulties in obtaining pixels with high positional accuracy.

In order to address the above problems, a method has been proposed in which a black matrix is formed by a color resist method, and thereafter, colored patterns (pixels) such as R, G, B, or the like are formed utilizing an inkjet method. However, in the cross-sectional shape of the black matrix thus obtained, the top ends or edge portions thereof apart from the substrate surface above the substrate tend to change to a round and gentle inclined shape during production processes after development, so that when inks with various colors are impinged onto spaces between the black matrix, the inks travel over the black matrix formed previously to cause color mixing of pixels adjacent to one another, resulting a in reduction in display quality when the color mixing is caused.

With regard to these phenomena, there are disclosures relating to a method for providing properties of mutual repellency to a black matrix and ink applied thereto, and a method for enhancing ink wetting properties in areas encompassed by a black matrix (for example, Patent Documents 4-6).

Patent Document 1: Japanese Patent Application Laid Open (JP-A) No. 1-152449;
Patent Document 2: Japanese Patent Application Laid Open (JP-A) No. 61-99102;
Patent Document 3: Japanese Patent Application Laid Open (JP-A) No. 8-227012;
Patent Document 4: Japanese Patent Application Laid Open (JP-A) No. 6-347637;
Patent Document 5: Japanese Patent Application Laid Open (JP-A) No. 7-35915; and
Patent Document 6: Japanese Patent Application Laid Open (JP-A) No. 10-142418.

DISCLOSURE OF INVENTION

Problem to be Solved by the Invention

However, the above-described conventional methods require particular materials, or a surface reform treatment for enhancing the surface energy of areas encompassed with a black matrix, thus resulting in problems in cost. Further, there are disadvantages of reduction in display quality caused by reasons other than the color mixing, in particular, occurrence of a reddish display in a white display or a black display.

The invention has been made in view of the above, and provides a method for producing a partition wall for a color filter capable of forming a sharp partition wall having a corner portion (edge) in non-contact with the surface of a substrate, and a substrate with partition wall for a color filter obtained by the method, a color filter for a liquid crystal display element having a high display quality with an excellent color hue without color mixing, and a liquid crystal display device.

Means for Solving Problem

Namely, the invention provides (1) a method for producing a partition wall for a color filter comprising: forming a photosensitive resin layer comprising a radical polymerizable monomer, a photopolymerization initiator, a binder and a colorant on at least one surface of a substrate; and exposing the photosensitive resin layer to light at an illumination intensity of 50 mW/cm$^2$ or more in a pattern shape and developing the photosensitive resin layer to form a partition wall that separates color pixel portions, wherein liquid droplets are applied to form the color pixel portions.

In a preferable embodiment (2), the method is characterized in that the light source for the exposure is a laser light.

In a further preferable embodiment (3), the methods (1) and (2) further comprise ink repellency treating to impart an ink-repelling property to at least a portion of the partition wall pattern.

In a further preferable embodiment (4), the methods (1) to (3) are characterized in that the ink repellency treating comprises a plasma treatment.

Further, the invention provides (5) a substrate having a partition wall for a color filter produced by a method of any one of (1) to (4).

Further, the invention provides (6) color filter for a display element comprising the substrate with partition walls for a color filter according to the above (5) and color pixel portions produced by a method comprising applying, by an inkjet process, liquid droplets into recessed portions among partition walls on the substrate having partition walls for a color filter.

Furthermore, the invention provides (7) a display device with a color filter for a display element according to the above (6).

Effect of the Invention

The invention can provide a method for producing a partition wall for a color filter capable of forming a partition wall having a sharp corner portion (edge) in non-contact with the surface of a substrate, and a substrate with partition wall for a color filter obtained by the method, a color filter for display element having a high display quality with an excellent color hue without color mixing, and a display device.

BRIEF DESCRIPTION OF THE DRAWINGS

FIG. 2A is a drawing showing a delta array as a pattern of a color filter; and

FIG. 2B is a drawing showing a grid or stripe structural array as a pattern of a color filter.

BEST MODE FOR CARRYING OUT THE INVENTION

Figure 1:
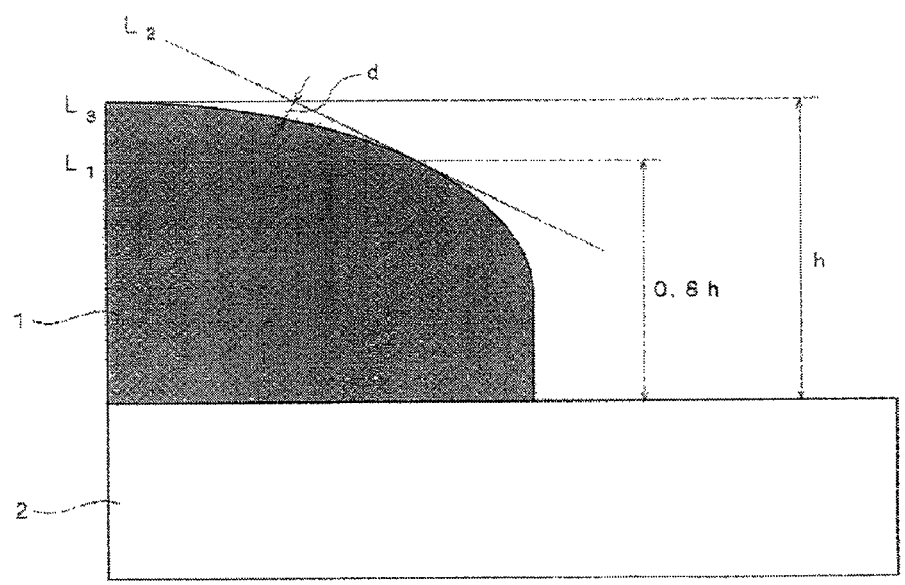
FIG. 1 is a conceptual drawing for explaining a cross-sectional shape of a separating partition wall.

Hereinafter, a method for producing a partition wall for a color filter of the invention will be described in detail, and the partition wall for a color filter obtained by the production method, and a color filter for display element and a display device using the same will be described in detail as well.

Production Method of Partition Wall for a Color Filter

The method for producing a partition wall for a color filter of the invention (hereinafter, sometimes simply referred to as "separating partition wall") includes at least: forming a photosensitive resin layer containing at least a radical polymerizable monomer, a photopolymerization initiator, a binder and a colorant on at least one surface of a substrate (hereinafter, sometimes referred to as "layer forming"), and exposing the formed photosensitive resin layer to light at an illumination intensity of 50 mW/cm$^2$ or more in a pattern shape and developing the resin layer to form a partition wall that separates color pixel portions, wherein liquid droplets are applied form the color pixel portions (hereinafter, sometimes referred to as "pattern forming"), and may arbitrarily include other processes such as a baking treatment or the like.

The "illumination intensity" means an intensity of illumination light on an object to be exposed, and specifically, the intensity can be measured by placing a common illuminometer (for example, UV-M10-S or UV-350 (both trade names, manufactured by ORC manufacturing Co., Ltd.)) at an exposure focal point to be exposed and exposing thereof.

Layer Forming

In the layer forming, a photosensitive resin layer containing at least a radical polymerizable monomer, a photopolymerization initiator, a binder and a colorant is formed on at least one surface of a substrate. The photosensitive resin layer formed in this process is a layer for forming a partition wall at the end.

The photosensitive resin layer contains at least a radical polymerizable monomer, a photopolymerization initiator, a binder and a colorant, and may further contain other components, if necessary. The photosensitive resin layer can be formed by a method of applying, for example, a photosensitive resin composition containing at least a radical polymerizable monomer, a photopolymerization initiator, a binder and a colorant onto a substrate (preferably, a coating method of coating the photosensitive resin composition), or a method of transferring a photosensitive resin layer onto a substrate by using a photosensitive transfer material, which will be described later (transfer method).

In the case that the photosensitive resin layer is formed by coating (coating method), the coating is preferably performed by use of slit-like nozzles having slit-like holes at a portion from which a liquid is discharged, or slit coaters.

More specifically, slit-like nozzles and slit coaters described in Japanese Patent Application Laid-Open (JP-A) Nos. 2004-89581, 2004-17043, 2003-170098, 2003-164787, 2003-10767, 2002-79163, 2001-310147 and the like can preferably be used. Examples thereof further include coating methods using coating machines such as a spinner, a whirler, a roll coater, a curtain coater, a knife coater, a wire bar coater, an extruder or the like.

When a transfer method is employed, by using a photosensitive transfer material, which will be described later, a photosensitive resin layer formed in a film shape on a temporary support is press-contacted or heat press-contacted onto a substrate surface with a heated and/or pressurized roller or flat plate to be adhered thereto, and thereafter, the temporary support is stripped off and the photosensitive resin layer is transferred to form the photosensitive resin layer on the substrate surface. More specifically, laminators and laminating methods described in JP-A Nos. 7-110575, 11-77942, 2000-334836 and 2002-148794 may be used. Details of transfer with photosensitive transfer materials and transfer methods will be described later.

While the thickness of the photosensitive resin layer varies with the solid content of the photosensitive resin composition and the height of a separating partition wall to be formed, and is not specifically limited, it is generally preferably 1 to 12 μm, more preferably 5 to 12 μm, furthermore preferably 1.8 to 8 μm, and particularly preferably 2.0 to 6.0 μm.

The photosensitive resin layer and photosensitive resin composition of the invention are preferably a layer or a composition with a high optical density and deep color, and a preferable optical density thereof is in a range of from 2.0 to 10.0, more preferably 2.5 to 6.0, and particularly preferably 3.0 to 5.0. Further, since the photosensitive resin layer and photosensitive resin composition are cured by a photo-initiation system described later, the optical density in exposure wavelengths (generally, ultraviolet region) is also important, and the value of the optical density is preferably in a range of from 2.0 to 10.0, more preferably 2.5 to 6.0, and particularly preferably 3.0 to 5.0. Within these ranges, polymerization and curing become favorable, and a separating partition wall having a desired shape can be formed. The property of the deep colors can be imparted to the photosensitive resin layer and photosensitive resin composition by various colorants such as dyes, pigments or the like as described later, carbon with various forms, or materials formed by combinations thereof, and the property is black color in most cases.

Photosensitive Resin Composition and Photosensitive Resin Layer Hereinafter, a photosensitive resin composition and constituent components of a photosensitive resin layer formed by using thereof will be described in detail.

Radical Polymerizable Monomer

The photosensitive resin layer or photosensitive resin composition of the invention contains at least one kind of radical polymerizable monomer. The monomer can be cured to form a pattern by the action of active species from photopolymerization initiators, which will be described later.

The radical polymerizable monomers are preferably a multi-functional monomer, and the multi-functional monomer may be used singly or in combination with other monomers.

Specific examples of the multi-functional monomers include t-butyl(meth)acrylate, ethylene glycol di(meth)acrylate, 2-hydroxypropyl(meth)acrylate, triethylene glycol di(meth)acrylate, trimethylol propane tri(meth)acrylate, 2-ethyl-2-butyl-propanediol di(meth)acrylate, pentaerythritol tri(meth)acrylate, pentaerythritol tetra(meth)acrylate, pentaerythritol hexyl(meth)acrylate, dipentaerythritol penta (meth)acrylate, polyoxyethylated trimethylolpropane tri (meth)acrylate, tris(2-(meth)acryloyloxyethyl)isocyanurate, 1,4-diisopropenyl benzene, 1,4-dihydroxybenzene di(meth) acrylate, decamethyleneglycol di(meth)acrylate, styrene, diallylfumarate, triallyl trimellitate, lauryl(meth)acrylate, (meth)acrylamide, xylene bis(meth)acrylamide, and the like. Specific examples thereof further include reaction products of compounds having a hydroxyl group such as 2-hydroxyethyl(meth)acrylate, 2-hydroxypropyl(meth)acrylate, polyethylene glycol mono(meth)acrylate or the like, and diisocyanates such as hexamethylene diisocyanate, toluene diisocyanates, xylene diisocyanates or the like.

Among these monomers, pentaerythritol tetraacrylate, dipentaerythritol hexaacrylate, dipentaerythritol pentaacrylate, and tris(2-acryloyloxyethyl)isocyanurate are particularly preferable.

The content of the radical polymerizable monomer in the photosensitive resin layer or the photosensitive resin composition is preferably 5 to 80% by mass, and particularly preferably 10 to 70% by mass with respect to the total solid content (by mass) in the layer or composition. The content in these ranges is effective for securing a resistance of the photosensitive resin layer or the photosensitive resin composition to an alkali developer after photocuring.

Photopolymerization Initiator

The photosensitive resin layer or the photosensitive resin composition in the invention contains at least one kind of photopolymerization initiators. The photopolymerization initiator is a compound that generates active species for initiating polymerization of the radical polymerizable monomers upon irradiation with radiation ray such as the visible ray, ultraviolet ray, far-ultraviolet ray, electron beam, X-ray or the like, and can be appropriately selected from known compounds.

Examples thereof include trihalomethyl group-containing compounds, acridine compounds, acetophenone compounds, bisimidazole compounds, triazine compounds, benzoin compounds, benzophenone compounds, α-diketone compounds, polynuclear quinone compounds, xanthone compounds, diszo compounds and the like.

Specific examples thereof include: trihalomethyl oxazole compounds or s-triazine compounds substituted with a trihalomethyl group as described in JP-A No. 2001-117230, trihalomethyl-s-triazine compounds as described in U.S. Pat. No. 4,239,850, trihalomethyl group-containing compounds such as trihalomethyl oxadiazole compounds as described in U.S. Pat. No. 4,212,976;

acridine compounds including 9-phenyl acridine, 9-pyridyl acridine, 9-pyrazinyl acridine, bis(9-acridinyl)alkanes such as 1,2-bis(9-acridinyl)ethane, 1,3-bis(9-acridinyl)propane, 1,4-bis(9-acridinyl)butane, 1,5-bis(9-acridinyl)pentane, 1,6-bis(9-acridinyl)hexane, 1,7-bis(9-acridinyl)heptane, 1,8-bis(9-acridinyl)octane, 1,9-bis(9-acridinyl)nonane, 1,10-bis(9-acridinyl)decane, or 1,11-bis(9-acridinyl)undecane, and 1,12-bis(9-acridinyl)dodecane;

triazine compounds such as 6-(p-methoxyphenyl)-2,4-bis (trichloromethyl)-s-triazine, or 6-[p-(N,N-bis(ethoxycarbonylmethyl)amino)phenyl]-2,4-bis(trichloromethyl)-s-triazine; and others such as 9,10-dimethylbenzphenzine, Michler's ketone, benzophenone/Michler's ketone, hexaarylbisimidazole/mercaptobenzimidazole, benzylmethyl ketal, thioxantone/amine, or 2,2'-bis(2,4-dichlorophenyl)-4,4',5,5'-terraphenyl-1,2'-bisimidazole.

Among the above compounds, the photopolymerization initiator preferably include at least one selected from the group consisting of trihalomethyl group-containing compounds, acridine compounds, acetophenone compounds, bisimidazole compounds and triazine compounds, and particularly preferably include at least one selected from the group consisting of trihalomethyl group-containing compounds and acridine compounds. The trihalomethyl group-containing compounds and acridine compounds are useful in view of a wide use and low cost.

Particularly preferable examples of the trihalomethyl group-containing compounds include 2-trichloromethyl-5-(p-styrylstyryl)-1,3,4-oxadiazole, and 2-(p-butoxystyryl)-5-trichloromethyl-1,3,4-oxadiazole; particularly preferable examples of the acridine compounds include 9-phenylacridine; particularly preferable examples of the triazine compound include 6-[p-(N,N-bis(ethoxycarbonylmethyl)amino) phenyl]-2,4-bis(trichloromethyl)-s-triazine; particularly preferable examples of the bezophenone compound include Michler's ketone; and particularly preferable examples of the bisimidazole compounds include 2,2'-bis(2,4-dichlorophenyl)-4,4',5,5'-terraphenyl-1,2'-bisimidazole.

The photopolymerization initiator may be used singly or in combination of two or more kinds. The total amount of the photopolymerization initiator in the photosensitive resin layer or the photosensitive resin composition is preferably 0.1 to 20% by mass, and particularly preferably 0.5 to 10% by mass relative to the total solid content (by mass) of the layer or the composition. When the total amount is within the above ranges, a high photocuring efficiency can be achieved and the resin can be cured in a short period of time, so that defects in an image pattern formed by development and roughness of the surface of the pattern do not arise.

The photopolymerization initiator may be used in combination with a hydrogen donor. In view of improve sensitivity, preferable examples of the hydrogen donor include mercaptan compounds and amine compounds, which will be defined hereinafter. Here, the "hydrogen donor" refers to a compound capable of donating a hydrogen atom to a radical generated from the photopolymerization initiator upon light exposure.

The mercaptan compound is a compound that has a benzene ring or a heterocyclic ring as a mother nuclei, and has one or more mercapto groups directly bonded to the mother nuclei (hereinafter, referred to as "mercaptan-containing hydrogen donor"). The number of the mercapto groups is preferably one to three, and more preferably one or two.

The amine compound is a compound that has a benzene ring or a heterocyclic ring as a mother nuclei, and has one or more amino groups directly bonded to the mother nuclei (hereinafter, referred to as "amine-containing hydrogen donor"). The number of the amino groups is preferably one to three, and more preferably one or two.

The hydrogen donor may have both of a mercapto group and an amino group together.

Specific examples of the mercaptan-containing hydrogen donors include 2-mercaptobenzothiazole, 2-mercaptobezoxazole, 2-mercaptobenzoimidazole, 2,5-dimercapto-1,3,4-thiadizole, and 2-mercapto-2,5-dimethylaminopyridine. In these compounds, 2-mercaptobenzothiazole and 2-mercaptobezoxazole are preferable, and 2-mercaptobenzothiazole is particularly preferable.

Examples of the amine-containing hydrogen donors include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, 4-dimethylaminobenzonitrile, and the like. In these compounds, 4,4'-bis (dimethylamino)benzophenone and 4,4'-bis(diethylamino)benzophenone are preferable, and 4,4'-bis(dimethylamino)benzophenone is particularly preferable.

The hydrogen donor may be used singly or in combination with two or more kinds thereof. It is preferable that one or more kinds of mercaptan-containing hydrogen donors and one or more kinds of amine-containing hydrogen donors are used in combination, since images formed by using such combination cannot be easily stripped off from a substrate during development, and the strength and sensitivity of the images can be increased.

Examples of the combination of the mercaptan-containing hydrogen donors and the amine-containing hydrogen donors include 2-mercaptobenzothiazole/4,4'-bis(dimethylamino)benzophenone, 2-mercaptobenzothiazole/4,4'-bis(diethylamino)benzophenone, 2-mercaptobenzoxazole/4,4'-bis(dimethylamino)benzophenone, 2-mercaptobenzoxazole/4,4'-bis(diethylamino)benzophenone, and the like. More preferable examples of the combination include 2-mercaptobenzothiazole/4,4'-bis(diethylamino)benzophenone, and 2-mercaptobenzoxazole/4,4'-bis(diethylamino)benzophenone, and particularly preferable examples of the combination include 2-mercaptobenzothiazole/4,4'-bis(diethylamino)benzophenone.

In the combinations of the mercaptan-containing hydrogen donors and the amine-containing hydrogen donors, the ratio (M:A) by mass of the mercaptan-containing hydrogen donors (M) to the amine-containing hydrogen donors (A) is preferably 1:1 to 1:4 in general, and more preferably 1:1 to 1:3.

The total amount of the hydrogen donor in the photosensitive resin layer or the photosensitive resin composition is preferably 0.1 to 20% by mass, and more preferably 0.5 to 10% by mass relative to the total solid content (by mass) of the layer or the composition.

Binder

The photosensitive resin layer or the photosensitive resin composition in the invention contains at least one kind of binders.

Preferable examples of the binders include polymers having polar groups such as carboxyl groups or carboxyl acid salt at the side chain thereof. Examples thereof include methacrylic acid copolymers, acrylic acid copolymers, itaconic acid copolymers, crotonic acid copolymers, maleic acid copolymers, partially esterified maleic acid copolymers and the like, as described in JP-A No. 59-44615, Japanese Examined Patent Application Publication (JP-B) Nos. 54-34327, 58-12577, 54-25957, JP-A Nos. 59-53836 and 59-71048.

Further, cellulose compounds having carboxylic acid groups at the side chain thereof are exemplified. Furthermore, polymers in which a cyclic acid anhydride is added to a polymer having hydroxyl groups are preferably used.

Particularly preferable examples thereof include multi-copolymers of benzyl(meth)acrylate and (meth)acrylic acid, and copolymers of benzyl (meth)acrylate, (meth)acrylic acid and other monomers, as described in U.S. Pat. No. 4,139,391. These binders having polar groups may be used alone, or may be used in a state of compositions of these binders and polymers generally used for layer formation.

The content of the binders in the photosensitive resin layer or the photosensitive resin composition is preferably 10 to 50% by mass, and more preferably 20 to 40% by mass relative to the total solid content (by mass) of the layer or the composition.

Colorant

The photosensitive resin layer or the photosensitive resin composition of the invention contains at least one kind of colorants. Visible images with desired colors can be formed by containing colorants in the photosensitive resin layer or the photosensitive resin composition.

Preferable examples of the colorants include pigments and dyes as described in paragraph numbers [0038]-[0054] in JP-A No. 2005-17716, pigments as described in paragraph numbers [0068]-[0072] in JP-A No. 2004-361447, and coloring agents as described in paragraph numbers [0080]-[0088] in JP-A No. 2005-17521.

In particular, organic pigments, inorganic pigments, dyes and the like are preferable, and in the case that a light-shielding property is required for the photosensitive resin layer or the photosensitive resin composition, light shielding agents including: carbon black; metal oxide powder, metal sulfide powder and metal powder such as titanium carbon, titanium oxide or iron tetroxide; and mixtures of red, blue and green pigments, and the like may be used. Conventionally-known colorants (dyes and pigments) can be used in the invention. Preferable examples of black colorants include carbon black, titanium carbon, iron oxide, titanium oxide, and graphite, and carbon black is particularly preferable.

When pigments are selected as colorants, the pigments are preferably dispersed uniformly in the photosensitive resin layer or the photosensitive resin composition.

The content of the colorants in the photosensitive resin layer or the photosensitive resin composition is preferably 30 to 70% by mass, more preferably 40 to 60% by mass, and further more preferably 50 to 55% by mass relative to the total solid content (by mass) of the layer or the composition, in light of reduction in developing time.

The pigment is preferably used in a form of a dispersion. The dispersion can be prepared by mixing the pigment and a dispersing agent in advance to obtain a composition and by adding and dispersing the composition into an organic solvent (or a vehicle), which will be described hereinafter. The vehicle refers to a medium in which a pigment can be dispersed when a paint is in a liquid state, and contains a component (binder) for curing a coated layer by binding the pigment to the binder, and a component (organic solvent) for dissolving and diluting the binder. Dispersing machines for use in dispersing the pigment are not specifically limited and examples thereof include known dispersing machines such as a kneader, a roll mill, an attrider, a super mill, a dissolver, a homomixer, or a sand mill as described in "Encyclopedia of Pigments" 1st Edition, written by Kunizo Asakura, pp 438, (2000), published by Asakura Publishing Co., Ltd. Further, the pigment may be pulverized finely by utilizing frictional force due to mechanical pulverization as described on page 310 of "Encyclopedia of Pigments".

From the viewpoint of dispersion stability, the particle diameter of the colorant (particularly pigment) is preferably from 0.001 μm to 0.1 μm, and more preferably from 0.01 μm to 0.08 μm in terms of the number average particle diameter. The "particle diameter" refers to a diameter expressed by a circle having an area equivalent to an area of a particle in an electron microscopic photograph of the particle, and the "number average particle diameter" refers to a mean value of 100 particles among a plurality of a particle.

Solvent

In general, the photosensitive resin composition used for preparing a separating partition wall in the invention may be formed by using an organic solvent in addition to the above-described components. Examples of the organic solvent include methyl ethylketone, propyleneglycol monomethylether, propyleneglycol monomethylether acetate, cyclohexanone, cyclohexanol, methylisobutylketone, ethyl lactate, methyl lactate, caprolactam and the like.

Other Components

The photosensitive resin layer or the photosensitive resin composition may further contain components such as surfactants, ultraviolet ray absorbers or other known additives such as plasticizers, fillers, stabilizers, thermal polymerization inhibitors, solvents, adhesion promoters or the like, which are described in the following. Further, the photosensitive resin composition is preferably at least softened or becomes adhesive at temperatures of 150° C. or less, and is preferably thermoplastic.

From this point of view, a compatible plasticizer may be added to the composition or the layer to reform thereof.

Surfactant

When a photosensitive resin composition is coated on a substrate or on a temporary support for a photosensitive transfer material, which will be described later, the coated layer can be controlled to have a uniform thickness to effectively prevent coating unevenness by incorporating a surfactant into the photosensitive resin composition. Preferable examples of the surfactant include surfactants described in JP-A Nos. 2003-337424 and 11-133600. The content of surfactants in the photosensitive resin composition is generally 0.001 to 1%, preferably 0.01 to 0.5%, and particularly preferably 0.03 to 0.3% with respect to the total solid content (by mass) of the photosensitive resin composition.

Ultraviolet Ray Absorber

The photosensitive resin composition may contain an ultraviolet ray absorber, if necessary. Examples of the ultraviolet ray absorber include compounds described in JP-A No. 5-72724, salicylate compounds, benzophenone compounds, benzotriazole compounds, cyanoacrylate compounds, nickel chelate compounds, and hindered amine compounds.

For example, phenyl salicylate, 4-t-butylphenyl salicylate, 2,4-di-t-butylphenyl-3',5'-di-t-4'-hydroxybezoate, 4-t-butylphenyl salicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methyphenyl)-5-chlorobenzotriazole, ethyl-2-cyano-3,3-di-phenylacrylate, 2,2'-hydroxy-4-methoxybenzophenone, nickel dibutyldithiocarbamate, bis (2,2,6,6-tetramethyl-4-pyridine)-sebacate, 4-t-butylphenyl salicylate, phenyl slicylate, 4-hydroxy-2,2,6,6-tetramethylpiperidine condensate, bis(2,2,6,6-tetramethyl-4-piperidenyl) succinate, 2-[2-hydroxy-3,5-bis($\alpha$,$\alpha$-dimethylbenzyl)phenyl]-2H-benzotriazole, 7-{[4-chloro-6-(diethylamino)-5-triazine-2-il]amino}-3-phenylcuomalin, and the like are exemplified.

When the ultraviolet ray absorber is used in the invention, the content of the ultraviolet ray absorber in the photosensitive resin composition is generally 0.5 to 15%, preferably 1 to 12%, and particularly preferably 1.2 to 10% relative to the total solid content in the photosensitive resin composition.

Thermal Polymerization Inhibitor

The photosensitive resin composition preferably contains a thermal polymerization inhibitor. Examples of thermal polymerization inhibitors include hydroquinone, hydroquinone monomethylether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, and phenothiazine.

When a thermal polymerization inhibitor is used in the invention, the content of the thermal polymerization inhibitor in the photosensitive resin composition is generally 0.01 to 1%, preferably 0.02 to 0.7%, and particularly preferably 0.05 to 0.5% relative to the total solid content in the photosensitive resin composition.

Further, the photosensitive resin composition may contain an "adhesion aid" as described in JP-A No. 11-133600, and other additives, in addition to the above-described components.

Photosensitive Transfer Material

Next, photosensitive transfer materials used for the transfer method will be described in detail.

The photosensitive transfer material has at least a layer (photosensitive resin layer), which is formed by using the photosensitive resin composition, on a temporary support, and may further have an intermediate layer, a thermoplastic resin layer, and a protective film if necessary. In the invention, exposure in the pattern forming is carried out at a high illumination intensity of 50 mW/cm$^2$ or more for curing the photosensitive resin layer prior to occurrence of polymerization inhibition due to oxygen. The intermediate layer is thus not always necessary, while it may be arbitrarily present.

Temporary Support

The temporary support may be appropriately selected from supports made of materials that are chemically and thermally stable, and flexible. Specifically, a thin sheet or film made of TEFLON (registered trademark), polyethylene terephthalate, polycarbonate, polyethylene, polypropylene, polyester or the like, or a laminated body thereof is preferable. Among them, in particular, a biaxially oriented polyethylene terephthalate film is preferable.

The thickness of the temporary support is suitably 5 to 300 μm, and preferably 20 to 150 μm. When the thickness is within the range, breakage of the temporary support during being striped off from the photosensitive resin layer can be prevented, and reduction of resolution when the photosensitive resin layer is exposed to light through the temporary support can be avoided.

Photosensitive Resin Layer

The photosensitive resin layer is made of the photosensitive resin composition, and characteristics of the shape or the like and the forming method of the photosensitive resin layer are similar to those of the layers formed by the above-described coating method, and preferable embodiments thereof are similar thereto as well.

Thermoplastic Resin Layer

A thermoplastic resin layer may be arbitrarily provided between the temporary support and the photosensitive resin layer. The thermoplastic resin layer is effective for an increase in adhesiveness between the temporary support and the substrate on which a separating partition wall is formed.

The thermoplastic resin layer contains at least a resin component, and is preferably alkali-soluble. The resin component of the thermoplastic resin layer is preferably a thermoplastic resin that is an alkali-soluble and having a substantial softening temperature of 80° C. or less.

Examples of the alkali-soluble thermoplastic resins having a softening temperature of 80° C. or less include a saponified product of a copolymer of ethylene and acrylic ester, a saponified product of a copolymer of styrene and (meth)acrylic ester, a saponified product of a copolymer of vinyltoluene and (meth)acrylic ester, poly(meth) acrylic ester, a saponified product of a copolymer of (meth)acrylic ester such as butyl (meth)acrylate or vinyl acetate, and the like.

In addition to the above, organic polymers soluble in an aqueous alkali solution among the organic polymers having a softening temperature of 80° C. or less, as described in "Encyclopedia of Plastic Performance" (edited by Japan Plastics Industry Federation and All Japan Plastic Forming Industrial Federation; issued by Kogyo Chosakai Publishing Inc. (issued on Oct. 25, 1968)), may be used.

Further, organic polymer materials having a softening temperature of 80° C. or more may be used by reducing a substantial softening temperature of the polymer materials by adding various types of plasticizers having a compatibility with the polymer materials into the organic polymer materials.

For the purpose of controlling adhesiveness with the temporary support, various kinds of polymers, supercooling materials, adhesion promoters, surfactants, releasing agents and the like may be added to these organic polymer materials, to such an extent that the substantial softening temperature does not exceed 80° C. Specific examples of favorable plasticizers include polypropylene glycol, polyethylene glycol, dioctyl phthalate, diheptyl phthalate, dibutyl phthalate, tricresyl phosphate, cresyldiphenyl phosphate, and biphenyldiphenyl phosphate.

Intermediate Layer

As described in the above, while an intermediate layer is not essential to the invention, the intermediate layer may be provided between the temporary support and the photosensitive resin layer, or between the thermoplastic resin layer and the photosensitive resin layer, as occasion demands.

More specifically, the intermediate layer preferably contains polyethylene, vinylidene chloride, polyvinyl alcohol (PVA) or the like as a main component (and particularly preferably contains PVA as a main component), and, if necessary, polymers such as polyvinyl pyrrolidone, polyacrylamide or the like may be added thereto. The PVA preferably has a saponification degree of 80% or more. The content of the PVA is preferably 25% to 99% by mass.

Protective Film

A protective film is preferably provided on the surface of the photosensitive resin layer formed on the temporary support for the purpose of protecting the surface from contamination or damages during storage. The protective film may be made of the same material as that of the temporary film or a material similar to that of the temporary film. It is important that the protective film can be easily separated from the photosensitive resin layer in view of achieving good transfer.

Examples of materials suitable for configuring the protective film include silicone paper and a sheet of polyolefin or polytetrafluoroethylene. The thickness of the protective film is generally 4 to 40 μm, preferably 5 to 30 μm, and particularly preferably 10 to 25 μm.

The photosensitive transfer material can be prepared in such a manner that, for example, a coating liquid (coating liquid for thermoplastic resin layer) in which constituent components for a thermoplastic resin layer is dissolved is coated on a temporary support and the coated layer is dried to form a thermoplastic resin layer, and a solution formed by using a solvent that does not dissolve the thermoplastic resin layer is coated on the thermoplastic resin layer and the resultant coated layer is dried to laminate an intermediate layer on the thermoplastic resin layer, and thereafter, a photosensitive resin composition prepared by the aforementioned manner by using a solvent that does not dissolve the intermediate layer is coated on the intermediate layer and the coated layer thus obtained is dried to laminate a photosensitive resin layer on the intermediate layer.

While the coating can be carried out by known coating methods as described above, it is preferable that the coating is carried out by the use of a coating machine (slit coater) using a slit-like nozzle.

In addition to the above, the photosensitive transfer material can be prepared by a method including: preparing a sheet, which has a thermoplastic resin layer and an intermediate layer provided on a temporary support, and a sheet, which has a photosensitive resin layer provided on a protective layer; and laminating these sheets such that an oxygen impermeable layer comes into contact with the photosensitive resin layer. The photosensitive transfer material can be also prepared by a method including: preparing a sheet, which has a thermoplastic resin layer on a temporary support, and a sheet, which has a photosensitive resin layer and an intermediate layer on a protective film; and laminating these sheet such that the thermoplastic resin layer comes into contact with the intermediate layer.

Substrate

Examples of the substrate include metal base materials, metal-laminated base materials, glasses, ceramics, synthetic resin films and the like. Substrates with a high transparency and dimension stability are preferable, and glasses and synthetic resin films are particularly preferable.

Pattern Forming

In the pattern forming, the photosensitive resin layer prepared in the layer forming is exposed in a pattern shape to light at a high illumination intensity of 50 mW/cm$^2$ or more, and is developed to form a partition wall pattern (separating partition wall) for separating color pixels formed by applying liquid droplets.

The separating partition wall is to separate each color pixel, and, in general, is black, while the color thereof is not limited to black. Coloration is preferably made with organic materials (various colorants such as dyes, pigments or the like) as describe above.

In the invention, since the photosensitive resin layer is exposed to light in a pattern shape at an illumination intensity of 50 mW/cm$^2$ or more, the polymerization reaction can be made prior to occurrence of polymerization inhibition due to oxygen even in the presence of oxygen so that the photosensitive resin layer can be cured to a high degree in a short period of time. Accordingly, it is not necessary to form an environment of a nitrogen atmosphere while controlling an oxygen partial pressure by purging oxygen with nitrogen, and a photosensitive transfer material can be produced without providing an oxygen impermeable layer so that a highly cured pattern image can be easily formed in a simple process.

Exposure can be carried out by irradiating the photosensitive resin layer with light through a mask with a desired pattern. At this time, the illumination intensity is set to 50 mW/cm$^2$ or more. The illumination intensity can be adjusted to the above range in such a manner that an output of a light source is raised, the number of light sources is increased, or the distance between a light source and an object to be exposed is shortened.

Within the above range, the illumination intensity for achieving the effects of the invention is preferably 300 mW/cm$^2$ or more, particularly preferably 2000 mW/cm$^2$ or more.

When the illumination intensity is lower than 50 mW/cm$^2$, the separating partition wall (partition wall pattern) may not be formed into a desired pattern, specifically, the top surface, which is not in contact with the surface of a substrate, of the separating partition wall provided on a substrate cannot be flat, in other words, a corner portion (edge), which is not in contact with the surface of the substrate, of the partition wall cannot be formed in a sharp shape. In view of achieving the effects of the invention, the upper limit of the illumination intensity is not specified, and the illumination intensity can be increased to a desired value unless problems arise in apparatuses or equipment. With respect to a specific cross-sectional shape of the separating partition wall, a preferable embodiment will be described later with reference to FIG. 1.

For the exposure, for example, a proximity type exposure machine with a super high pressure mercury lamp (for example, machine manufactured by Hitachi Hitec Engineering Co. Ltd.) may be used. As a light source, a medium to super high pressure mercury lamp, a xenon lamp, a metal halide lamp, and the like as well as various types of laser sources are exemplified. Particularly, embodiments in which a laser is used as a light source are preferable.

After exposure, the photosensitive resin layer is developed with a developer to form a pattern image thereon. Thereafter, washing can be conducted if necessary.

Prior to development, it is preferable that pure water is sprayed onto the photosensitive resin layer from a shower nozzle or the like to dampen uniformly the surface of the photosensitive resin layer. An aqueous dilute solution of an alkaline material is preferably used in the developer for use in the development. Further, a small amount of an organic solvent which is miscible with water may be added to the developer.

Examples of the alkaline material include alkali metal hydroxides (for example, sodium hydroxide and potassium hydroxide), alkali metal carbonates (for example, sodium carbonate and potassium carbonate), alkali metal bicarbonates (for example, sodium bicarbonate and potassium bicarbonate), alkali metal silicates (for example, sodium silicate and potassium silicate), alkali metal metasilicates (for example, sodium metasilicate and potassium metasilicate), triethanol amine, diethanol amine, monoethanolamine, morpholine, tetraalkyl ammonium hydroxides (for example, tetramethyl ammonium hydroxide), trisodium phosphate, and like are exemplified. The concentration of the alkaline material is preferably 0.01 to 30% by mass, and the pH value thereof is preferably 8 to 14.

Preferable examples of the "organic solvent miscible with water" include methanol, ethanol, 2-propanol, 1-propanol, butanol, diacetone alcohol, ethyleneglycol monomethylether, ethyleneglycol monoethylether, ethyleneglycol mono-n-butylether, benzyl alcohol, acetone, methylethyl ketone, cyclohexanone, $\epsilon$-caprolactone, $\gamma$-butylolactone, dimethyl formamide, dimethyl actoamide, hexamethyl phosphoramide, ethyl lactate, methyl lactate, $\epsilon$-caprolactum, N-methylpyrrolidone, and the like. The concentration of the organic solvent miscible with water is preferably 0.1 to 30% by mass.

Further, known surfactants may be added to the organic solvent, and the concentration of the surfactants is preferably 0.01 to 10% by mass.

The developer may be used in a form of a bath liquid or an atomized liquid.

When uncured portions of the photosensitive resin layer are removed, a method in which the layer is rubbed with a rotating brush or a wet sponge in the developer may be used in combination. The temperature of the developer is preferably approximately from room temperature to 40° C. While the developing time varies with the composition of the photosensitive resin layer, alkalinity or temperature of the developer, and the kind or concentration of the organic solvent if it is added, in general, it is from about 10 seconds to 2 minutes. Within this range, a separating partition wall with a favorable shape can be obtained. In other words, if the developing time is too short, the development of areas to be removed by development may become insufficient, and at the same time, the absorbance of ultraviolet ray may become insufficient, and, to the contrary, if the developing time is too long, cured areas may be etched.

In the invention, as shown in FIG. 1, the cross-sectional shape of the separating partition wall (partition wall pattern) formed on the substrate has preferably a value d/h of 0.04 or less obtained in such a manner that, when h is the height of the separating partition wall 1 from the surface of the substrate 2 at the point from the surface of the substrate, $L_1$ is a line parallel to the substrate at the position of 0.8 h from the substrate, and $L_2$ is a tangent line at the point where the line $L_1$ contacts the separating partition wall, $L_3$ is a line parallel to the substrate at the position of h, and, the value d defined by the distance (the distance on the line perpendicular to the tangent line $L_2$) from the intersection of $L_2$ and $L_3$ to the separating partition wall is divided by the value h to obtain the value (d/h).

When the photosensitive resin layer is polymerized by pattern exposure on a substrate, the exposure amount is attenuated from the surface of the layer toward the substrate due to the light absorption by the photosensitive resin layer itself, so that the curing reaction further proceeds at the surface of the layer. In addition, making the illumination intensity to be 50 mW/cm$^2$ or more in the pattern exposure enables to cause the curing reaction prior to occurrence of polymerization inhibition due to oxygen. Accordingly, the surface of the layer can further be cured, and at the same time, the curing reaction within the layer can effectively be promoted. Accordingly, the partition wall having a sharp corner portion (edge) that is not in contact with the surface of the substrate can be formed.

More specifically, in the cross-sectional shape of the separating partition wall formed on the substrate, when h is the height of the separating partition wall 1 at the highest point from the substrate, $L_1$ is a line parallel to the substrate at the position of 0.8 h from the substrate and $L_2$ is a tangent line at the point where the line $L_1$ contacts the separating partition wall, and $L_3$ is a line parallel to the substrate at the position of h, the value d defined by the distance (the distance on the line perpendicular to the tangent line $L_2$) from the intersection of $L_2$ and $L_3$ to the separating partition wall is divided by the value h (d/h) to obtain the value of 0.04 or less. In practice, these values can be obtained in such a manner that a separating partition wall formed on a substrate is cut in a vertical direction together with the substrate to expose a cross-sectional surface thereof, and the cross-sectional surface can be directly observed and measured under a microscope or the like. In the separating partition wall thus formed, ink droplets injected and applied in recessed portions surrounded by the separating partition walls (spaces for forming color images among separating partition walls) are not apt to get over the separating partition walls so that ink bleed, ink smudges, color mixing between adjacent pixel patterns, white deletion in a pixel pattern and the like can be prevented, and a color filter with an excellent color hue and a high display quality can be obtained. The value of d/h is preferably 0.038 or less, and more preferably 0.035 or less.

Hereinafter, examples of methods for forming the partition wall for a color filter are explained in detail.

1) Formation of Separating Partition Wall by Coating Using Photosensitive Resin Composition After a substrate is washed, the substrate is subjected to a thermal treatment to stabilize the surface conditions thereof. Thereafter, a temperature of the substrate is adjusted, and a photosensitive resin composition is coated on the temperature-adjusted substrate. After coating, a part of solvent in the coated layer is removed by drying to lose the fluidity of the layer, followed by pre-baking so that a photosensitive resin layer is obtained (layer forming process). Prior to the pre-baking, excess coating solution on the periphery of the substrate may be removed by an EBR (edge bead remover) or the like. The coating can be carried out by means of a known coater equipped with a slit-shape nozzle for glass substrates (for example, MH-1600 (trade name; manufactured by F.A.S. Asia Co., Ltd.) and the like. Further, the drying can be carried out by means of a known drying apparatus (for example, a VCD (vacuum drying device) manufactured by Tokyo Ohka Kogyo. Co. Ltd.) and the like, and the pre-baking can be carried out, for example, at a temperature of 120° C. for 3 minutes. The thickness of the photosensitive resin layer is mentioned in the above.

Subsequently, in a state where the substrate having the photosensitive resin layer thereon and a mask (for example, a quartz exposure mask) are vertically upright, the distance between the mask surface and the photosensitive resin layer is appropriately set (for example, 200 μm), the photosensitive resin layer is exposed to light at an illumination intensity of 50 mW/cm² or more in the presence of oxygen. After exposure, developing is carried out with a developer to obtain a pattern image, and washing with water may be further carried out if necessary, to obtain a separating partition wall is obtained (pattern forming). When the oxygen partial pressure during exposure is measured, an oxygen meter (for example, Model G-102 (trade name; manufacture by Iijima Electronics Corporation) can be used.

2) Formation of Separating Partition Wall by Transfer Method Using Photosensitive Transfer Material First, a protective film is stripped off and removed from a photosensitive transfer material, and the exposed surface of the photosensitive resin layer is superposed on the surface of a substrate, and the superposed layer and the substrate are passed through a laminator or the like to apply heat and/or pressure thereto to form a laminated body. The laminator may appropriately be selected from known laminators, vacuum laminators and the like, and an autocut laminator can be used in view of enhancing productivity. Next, a temporary support is stripped off and removed from the laminated body. Subsequently, a desired photomask (for example, quartz exposure mask) is placed above the exposed surface by removing the temporary support, and the photosensitive resin layer is irradiated with ultraviolet ray in a pattern form through the mask in the presence of oxygen, and after the irradiation, the irradiated photosensitive resin layer is developed with a predetermined processing solution to obtain a separating partition wall. At this time, washing with water may be further carried out if necessary. The developer used for the developing, and the light source used for the exposure are the same as the developer and the light source in the coating method.

Other Processes

The method for producing the partition wall for a color filter of the invention may further have other processes such as a baking process including heating (baking) for further curing the partition wall pattern which has been formed, or a process subjecting the partition wall pattern on a substrate to an ink repellent treatment after the layer forming and the pattern forming and before the color pixel forming (hereinafter referred to as "ink repellent treating").

Hereinafter, the ink repellent treating is described in detail.

In the invention, it is preferable to form a plurality of pixels by applying liquid droplets to recessed portions among the separating partition walls after the separating partition wall is subjected to the ink repellent treatment, namely, after at least a part of the separating partition wall (partition wall pattern) has become an ink repellent state The ink repellent treatment can effectively solve problems such that the liquid droplets (ink droplets) of the colored liquid composition get over the separating partition wall to be smudged or color mixing among inks for forming pixels adjacent to one another occurs when applying liquid droplets by ink jet method.

The ink repellent treatment is a treatment for providing the liquid droplets of colored liquid composition to be applied with an ink repelling property, and means therefor is not specifically limited. For example, fluorine compounds, silicon compounds and the like are applied to at least a part of the separating partition wall by the following methods.

Specifically, examples of the ink repellent treatment include: (1) a method for kneading an ink repellent material into the separating partition wall; (2) a method for providing an additional ink repellent layer; (3) a method for providing an ink repellent property by means of plasma treatment; and (4) a method for coating an ink repellent material on the wall surface of the separating partition wall, while the treatment is not limited thereto. Hereinafter, the repellent treatment are respectively described in detail.

(1) Method for Kneading Ink Repellent Material into Separating Partition Wall

Examples of a means for preventing color mixing include forming the separating partition wall with a photosensitive resin composition containing a fluorine-containing resin (A).

The fluorine-containing resin (A) has an Rf group (a) with a polyfluoroether structure represented by the following Formula 1 and an acidic group (b), and preferably as an acid value of 1 to 300 mg KOH/g.

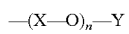  Formula 1

In Formula 1, X represents a divalent saturated hydrocarbon group having 1 to 10 carbon atoms, or a fluorinated divalent saturated hydrocarbon group having 1 to 10 carbon atoms. (X—O) units, which are contained by the number of n, represent the same groups or different groups from each other. Y represents a hydrogen atom (only in the case that a fluorine atom is not bonded to a carbon atom adjacent to an oxygen atom adjacent to Y), a monovalent saturated hydrocarbon group having 1 to 20 carbon atoms, or a fluorinated monovalent saturated hydrocarbon group having 1 to 20 carbon atoms. n represents an integer of from 2 to 50. In Formula 1, the total number of fluorine atoms is 2 or more.

In embodiments of X and Y in Formula 1 in the above, X represents a fluorinated alkylene group having 1 to 10 carbon atoms which are fluorinated except for one having a hydrogen atom, or a perfluorinated alkylene group having 1 to 10 carbon atoms, (X—O) units contained by the number of n represent the same groups or different groups from each other, and Y represents a fluorinated alkyl group having 1 to 20 carbon atoms which are fluorinated while having one hydrogen atom, or a perfluorinated alkyl group having 1 to 20 carbon atoms.

In more preferable embodiments of X and Y in Formula 1, X represents a perfluorinated alkylene group having 1 to 10 carbon atoms, (X—O) units contained by the number of n represent the same groups or different groups from each other, and Y represents a perfluorinated alkyl group having 1 to 20 carbon atoms.

In the case that X and Y are those in the above embodiments, the fluorine-containing resin (A) exhibits an excellent ink repellent property.

In Formula 1, n represents an integer of 2 to 50, preferably 2 to 30, and more preferably 2 to 15. When n is 2 or more, an ink coming-off property becomes good. When n is 50 or less, the compatibility of these monomers becomes good in the case that the fluorine-containing resin (A) is synthesized by copolymerizing monomers having an Rf group (a), monomers having an acidic group (b), and arbitrarily other monomers.

The total number of carbon atoms in the Rf group (a) having a polyfluoroether structure represented by Formula 1 is preferably 2 to 50, and more preferably 2 to 30. Within these ranges, the fluorine-containing resin (A) exhibits a good ink repellent property, and particularly an organic solvent repellent property. Further, the compatibility of these monomers becomes good in the case that the fluorine-containing resin (A) is synthesized by copolymerizing monomers having an Rf group (a), monomers having an acidic group (b), and arbitrarily other monomers.

Specific examples of the X include —$CF_2$—, —$CF_2CF_2$—, —$CF_2CF_2CF_2$—, —$CF_2CF(CF_3)$—, —$CF_2CF_2CF_2CF_2$—, —$CF_2CF_2CF(CF_3)$— and —$CF_2CF(CF_3)CF_2$—.

Specific examples of the Y include —$CF_3$, —$CF_2CF_3$, —$CF_2CHCF_2$, —$(CF_2)_2CF_3$, —$(CF_2)_3CF_3$, —$(CF_2)_4CF_3$, —$(CF_2)_5CF_3$, —$(CF_2)_6CF_3$, —$(CF_2)_7CF_3$, —$(CF_2)_8CF_3$, —$(CF_2)_9CF_3$, and —$(CF_2)_{11}CF_3$, —$(CF_2)_{15}CF_3$.

Preferable embodiments of the Rf group (a) having a polyfluoroether structure represented by Formula 1 include Rf groups (a) represented by the following Formula 2.

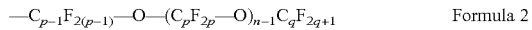

Formula 2

In Formula 2, p represents an integer of 2 or 3, the units ($C_pF_{2p}$—O) contained by the number of n−1 represent are the same groups, q represents an integer of 1 to 20, and n represents an integer of 2 to 50.

Specific examples of the Rf groups (a) represented by Formula 2 include —$CF_2O(CF_2CF_2O)_{n-1}CF_3$ (n is 2 to 9), —$CF(CF_3)O(CF_2CF(CF_3)O)_{n-1}C_6F_{13}$ (n is 2 to 6), and —$CF(CF_3)O(CF_2CF(CF_3)O)_{n-1}C_3F_7$ (n is 2 to 6) are exemplified in light of easiness of synthesis thereof.

The Rf groups (a) in the fluorine-containing resin (A) may be the same or different from one another. Further, the content of fluorine atoms in the fluorine-containing resin (A) is preferably 1 to 60%, and more preferably, 5 to 40%. Within these ranges, the fluorine-containing resin (A) has a good ink repellent property, and the developability when the photosensitive resin composition is developed becomes good.

The fluorine-containing resin (A) has an acidic group (b), and preferable examples of the acidic group (b) include at least an acidic group selected from the group consisting of a carboxyl group, a phenolic hydroxyl group and a sulfonic acidic group and a salt thereof.

The acid value of the fluorine-containing resin (A) is preferably 1 to 300 mgKOH/g, more preferably 5 to 200 mgKOH/g, and particularly preferably 10 to 150 mgKOH/g. Within these ranges, the developability when the photosensitive resin composition is developed becomes good. Here, the acid value is the mass (unit by mg) of potassium hydroxide required for neutralizing one gram of the resin, and the unit thereof is "mgKOH/g" in this specification.

The number average molecular weight of the fluorine-containing resin (A) is preferably 500 or more to less than 20,000, and more preferably 2,000 or more and less than 15,000. Within theses ranges, the developability when the photosensitive resin composition is developed becomes good. The number average molecular weight is measured by means of the gel permeation chromatography method by use of polystyrene as a reference material.

The fluorine-containing resin (A) is a copolymer containing: a constituent unit derived from a monomer having an ethylenic double bond and the Rf group (a); and a constituent unit derived from a monomer having an ethylenic double bond and the acidic group (b), and has preferably an acid value of 1 to 300 mgKOH/g.

As the ethylenic double bond, a (meth)acryloyl group, a vinyl group and an allyl group are exemplified.

As the monomer having the ethylenic double bond and the Rf group (a), $CH_2$=$CR^1COOQ^2Rf$, $CH_2$=$CR^1OCOQ^1Rf$, $CH_2$=$CR^1OQ^1Rf$, $CH_2$=$CR^1CH_2OQ^1Rf$, $CH_2$=$CR^1COOQ^2NR^1SO_2Rf$, $CH_2$=$CR^1COOQ^2NR^1CORf$, $CH_2$=$CR^1COOQ^2NR^1COOQ^2Rf$, $CH_2$=$CR^1COOQ^2OQ^1Rf$, and the like are exemplified. Here, $R^1$ represents a hydrogen atom or a methyl group, $Q^1$ represents a single bond or a divalent organic group having 1 to 6 carbon atoms, and $Q^2$ represents a divalent organic group having 1 to 6 carbon atoms. $Q^1$ and $Q^2$ each may have a cyclic structure.

Specific examples of $Q^1$ and $Q^2$, each independently represent —$CH_2$—, —$CH_2CH_2$—, —$CH(CH_3)$—, —$CH_2CH_2CH_2$—, —$C(CH_3)_2$—, —$CH(CH_2CH_3)$—, —$CH_2CH_2CH_2CH_2$—, —$CH(CH_2CH_2CH_3)$—, —$CH_2(CH_2)_3CH_2$—, —$CH(CH_2CH(CH_3)_2)$—, —$CH_2CH(OH)CH_2$—, —$CH_2CH_2NHCOOCH_2$—, —$CH_2CH(OH)CH_2OCH_2$—, and the like. Among them, —$CH_2$—, —$CH_2CH_2$— and —$CH_2CH(OH)CH_2$— are preferable in view of easiness of synthesis thereof.

Specific examples of the monomer having an ethylenic double bond and the Rf group (a) include $CH_2$=$CHCOOCH_2CF_2O(CF_2CF_2O)_{n-1}(CF_3)$ (n is 3 to 9), $CH_2$=$CHCOOCH_2CF(CF_3)O(CF_2CF(CF_3)O)_{n-1}C_6F_{13}$ (n is 2 to 6), $CH_2$=$CHCOOCH_2CF(CF_3)O(CF_2CF(CF_3)O)_{n-1}C_3F_7$ (n is 2 to 6), $CH_2$=$C(CH_3)COOCH_2CH_2NHCOOCH_2CF_2O(CF_2CF_2O)_{n-1}CF_3$ (n is 3 to 9), $CH_2$=$C(CH_3)COOCH_2CH_2NHCOOCH_2CF(CF_3)O(CF_2CF(CF_3)O)_{n-1}C_3F_7$ (n is 2 to 6), $CH_2$=$C(CH_3)COOCH_2CH_2NHCOOCH_2CF(CF_3)O(CF_2CF(CF_3)O)_{n-1}C_6F_{13}$ (n is 2 to 6), $CH_2$=$C(CH_3)COOCH_2CH(OH)CH_2OCH_2CF_2O(CF_2CF_2O)_{n-1}CF_3$ (n is 3 to 9), $CH_2$=$C(CH_3)COOCH_2CH(OH)CH_2OCH_2CF(CF_3)O(CF_2CF(CF_3)O)_{n-}C_6F_{13}$ (n is 2 to 6), $CH_2$=$C(CH_3)COOCH_2CH(OH)CH_2OCH_2CF(CF_3)O(CF_2CF(CF_3)O)_{n-}C_3F_7$ (n is 2 to 6), and the like.

The ratio of the constituent units derived from the monomer having the ethylenic double bond and the Rf group (a) in the fluorine-containing resin (A) is preferably 1 to 95 mole %, preferably 5 to 80 mole %, and further more preferably 20 to 60 mole %. Within these ranges, the fluorine-containing resin has a good ink repellent property, and the developability when the photosensitive resin composition is developed becomes good.

As the monomers containing an acidic group (b), for example, monomers having a carboxyl group, monomers having a phenolic hydroxyl group and monomers having a sulfonic acid group are exemplified.

Examples of the monomers having a carboxyl group include an acrylic acid, a methacrylic acid, a vinyl acetic acid, a crotonic acid, an itaconic acid, a maleic acid, a fumaric acid, and a cinnamic acid, and salts thereof. These can be used singly or in combination.

Examples of the monomers having a phenolic hydroxyl group include o-hydroxystyrene, m-hydroxystyrene, p-hydroxystyrene, and the like. Examples thereof further include compounds in which one or more hydrogen atoms on the benzene ring of these compounds are substituted with an alkyl group such as a methyl group, an ethyl group, an n-butyl group or the like; an alkoxy groups such as a methoxy group, an ethoxy group, an n-butoxy group or the like; a halogen atom; haloalkyl groups in which one or more hydrogen atoms in an alkyl group are substituted with a halogen atom; and a nitro group, a cyano group and an amide group. These compounds may be used singly or in combination.

Examples of the monomers having a sulfonic acid group include vinyl sulfonic acid, styrene sulfonic acid, (meth)allyl sulfonic acid, 2-hydroxy-3-(meth)allyloxypropane sulfonic acid, 2-sulfoethyl(meth)acrylate, 2-sulfopropyl(meth)acrylate, 2-hydroxy-3-(meth)acryloxypropane sulfonic acid, 2-(meth)acrylamide-2-methylpropane sulfonic acid, and salts thereof. These monomers may be used singly or in combination.

The ratio of the constituent units derived from the monomer having an acidic group (b) in the fluorine-containing resin is preferably 0.1 to 40% by mole, preferably 0.5 to 30% by mole, and further more preferably 1 to 20% by mole. Within these ranges, the fluorine-containing resin has a good ink repellent property, and the developability when the photosensitive resin composition is developed becomes good.

When the fluorine-containing resin is a copolymer containing the constituent unit derived from the monomer having an ethylenic double bond and the Rf group (a) and the constituent unit derived from the monomer having an ethylenic double bond and the acidic group (b), the fluorine-containing resin may further have constituent units derived from a monomer (hereinafter referred to as an "additional monomer") that does not have the Rf group (a) and the acidic group (b). Examples of the additional monomers include hydrocarbon olefins, vinyethers, isopropenylethers, allylethers, vinylesters, allylesters, (meth)acrylic acid esters, (meth)acrylic amides, aromatic vinyl compounds, chloro-olefins, fluoro-olefins and conjugate dienes. These compounds may contain functional groups, and examples of the functional groups include a hydroxyl group, a carbonyl group, an alkoxy group, an amide group and the like. Further, these compounds may have a group with a polysiloxane structure. Here, the constituent units derived from the additional monomer do not have the Rf group (a) and the acidic group (b). The additional monomers can be used singly or in combination. In particular, (meth)acrylic acid esters and (meth)acrylic amides are preferable in view of enhancing heat resistance of a layer formed by a photosensitive resin composition containing thereof.

The ratio of the constituent units derived from the other monomer in the fluorine-containing resin is preferably 80% by mole or less, and more preferably 70% by mole or less. Within these ranges, the developability when the photosensitive resin composition is developed becomes good.

The fluorine-containing resin can be obtained by synthesizing a copolymer containing a constituent unit derived from a monomer having the ethylenic double bond and the Rf group (a) and a constituent unit derived from a monomer having the ethylenic double bond and the acidic group (b). In addition, the fluorine-containing resin can also be obtained by allowing to react a polymer having reaction sites with a compound having the Rf group (a) and/or a compound having the acidic group (b).

There are various modifying methods in which a polymer having reaction sites is allowed to react with a compound having the Rf group (a), and examples thereof include: a method in which monomers having an epoxy group are co-polymerized in advance, and thereafter, a compound having the Rf group (a) and a carboxyl group are allowed to react with the copolymer; and a method in which monomers having an epoxy group are co-polymerized in advance, and thereafter, a compound having the Rf group (a) and a hydroxyl group are allowed to react with the copolymer.

Specific examples of the monomer having an epoxy group include glycidyl (meth)acrylate and 3,4-epoxycyclohexyl methylacrylate.

Examples of the compound having the Rf group and the carboxyl group include a compound represented by the following Formula 3.

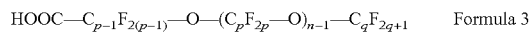

Formula 3

In Formula 3, p represents an integer of 2 or 3, q represents an integer of 1 to 20 and n represents an integer of 2 to 50.

Examples of the compound having the Rf group and the hydroxyl group include a compound represented by the following Formula 4.

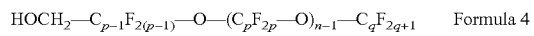

Formula 4

In Formula 4, p represents an integer of 2 or 3, q represents an integer of 1 to 20 and n represents an integer of 2 to 50.

There are various modifying methods in which a polymer having reaction sites is allowed to react with a compound having the acidic group (b), and examples thereof include: a method in which monomers having a hydroxyl group are co-polymerized in advance, and thereafter, an acid anhydride is allowed to react with the copolymer; and a method in which an acid anhydride having ethylenic double bonds is co-polymerized in advance, and thereafter, a compound having a hydroxyl group is allowed to react with the copolymer.

Examples of the monomers having a hydroxyl group include vinyl phenol, 2-hydroxyethyl(meth)acrylate, 2-hydroxypropyl(meth)acrylate, 3-hydroxypropyl (meth)acrylate, 4-hydroxybutyl(meth)acrylate, 5-hydroxypentyl(meth)acrylate, 6-hydroxyhexyl(meth)acrylate, 4-hydroxycyclohexyl(meth)acrylate, neopentylglycol mono (meth)acrylate, 3-chloro-2-hydroxypropyl(meth)acrylate, glycerin mono(meth)acrylate, 2-hydroxyethyl vinylether, 2-hydroxybutyl vinylether, cyclohexanediol monovinylether, 2-hydroxyethyl allylether, N-hydroxymethyl (meth)acrylamide, N,N-bishydroxymethyl, and the like.

Examples of the monomers having a hydroxyl group further include monomers having a polyoxyethylene chain with a hydroxyl group at the terminal end thereof. For example, $CH_2=CHOCH_2C_6H_{10}CH_2O(C_2H_4O)_gH$ (here, g represents an integer of 1 to 100, hereinafter the same as this), $CH_2=CHOC_4H_8O(C_2H_4O)_gH$, $CH_2=CHCOOC_2H_4O(C_2H_4O)_gH$, $CH_2=C(CH_3)COOC_2H_4O(C_2H_4O)_gH$, $CH_2=CHCOOC_2H_4O(C_2H_4O)_h(C_3H_6O)_kH$ (here and hereinafter, h represents 0 or an integer of 1 to 100, k represents an integer of 1 to 100, and h+k=1 to 101), $CH_2=C(CH_3)COOC_2H_4O(C_2H_4O)_h(C_3H_6O)_kH$ and the like are exemplified. These are used singly or in combination of two or more kinds.

Specific examples of the acid anhydrides include phthalic anhydride, 3 methyl phthalic anhydride, trimellitic anhydride and the like.

Specific examples of the acid anhydrides with an ethylenic double include maleic anhydride, itaconic anhydride, citraconic anhydride, methyl-5-norbornene-2,3-dicarboxylic anhydride, 3,4,5,6-tetrahydrophthalic anhydride, cis-1,2,3,6-tetrahydrophthalic anhydride, 2-butene-1-ilsuccinic anhydride, and the like.

The compounds having a hydroxyl group are compounds having one or more hydroxyl groups, and examples thereof include: the specific examples of monomers having a hydroxyl group shown in the above; alcohols such as ethanol, 1-propanol, 2-propanol, 1-butanol, or ethylene glycol; cellosolves such as 2-methoxy ethanol, 2-ethoxy ethanol, or 2-butoxy ethanol; and carbitols such as 2-(2-methoxyethoxy)ethanol, 2-(2-ethoxyethoxy)ethanol, or 2-(2-butoxyethoxy) ethanol. The compounds preferably contain one hydroxyl group in a molecule. These compounds may be used singly or in combination of two or more kinds.

The fluorine-containing resin or the polymer with the reaction sites to be a precursor of the fluorine-containing agent can be synthesized by a method in which monomers are dissolved in a solvent, arbitrarily together with a chain transfer agent, and heated, and are allowed to react by adding a polymerization initiator thereto.

The amount of the fluorine-containing resin (A) in the photosensitive resin composition is preferably 0.01 to 50% by mass, more preferably 0.1 to 30% by mass, particularly preferably 0.2 to 10% by mass relative to the solid content of the composition. Within these ranges, the fluorine-containing resin has a good ink repellent property and ink coming-off property, and the developability when the photosensitive resin composition is developed becomes good.

(2) Method for Providing Ink Repellent Layer

Examples of a means for preventing color mixing include forming a partition wall having an ink repellent property (hereinafter referred to as "ink repellent layer") on the separating partition wall formed on a substrate, at a position at least apart from the substrate, for instance, at an upper portion of the wall.

A silicone rubber layer is preferably used as the ink repellent partition wall It is necessary that the silicone rubber layer is disposed on the surface layer of the separating partition wall, and has a repellent effect to a solution used for coloration and to ink. While the silicone rubber layer is not specifically limited, it is preferably a layer having, as a main component, a linear organopolysiloxane with a molecular weight of from several thousands to several hundred thousands having the following repeating unit:

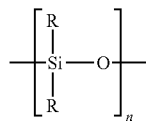

Here, n represents an integer of 2 or more, R represents an alkyl group having 1 to 10 carbon atoms, an alkenyl group or a phenyl group.

A silicone rubber can be obtained by sparsely crosslinking such a linear organopolysiloxane. Examples of a crosslinking agent for the crosslink include acetoxysilane, ketoximesilane, alkoxysilane, aminosilane, amidosilane, alkenyloxysilane and the like used for a so-called room temperature (low temperature) curing type silicone rubber, and are generally used in combination with a linear organopolysiloxane having a hydroxyl group at the terminal end thereof to form a deacetic acid type silicone rubber, a deoxime type silicone rubber, a dealcohol type silicone rubber, a deamine type silicone rubber, a deamido type silicone rubber, and a deketone type silicone rubbers, respectively. A small amount of an organic tin compound and the like is generally added to the silicone rubbers as a catalyst.

Further, in order to adhere the silicone rubber layer to the separating partition wall, a variety of compounds may be used for an adhesive layer at the interface portion thereof. Particularly preferable examples thereof include an amino silane compound and an organic titanate compound. Instead of providing such an adhesive layer between the separating partition wall and the silicone rubber layer, an adhesive component may be added to the silicone rubber layer. Examples of the adhesive component to be added include an amino silane compound and an organic titanate compound.

In order to prepare a partition wall, first, a silicone rubber layer is formed on a substrate on which the separating partition wall is formed. At this time, the exposure for preparing the partition wall is performed from the surface on which a separating partition wall is not formed on the substrate (back surface) by use of the separating partition wall as a mask, and further, by scattering irradiating UV light so that the incident light is spread so as to be broader than the size of the transmitting portion to irradiate the photosensitive resin layer with the incident light so that the portion of the resin to be solubilized due to a photoreaction becomes larger at the side of the silicone rubber. After the exposure in this manner, the resin layer is developed with a mixed liquid of n-heptane/ethanol so that the partition wall with a silicone rubber layer can be prepared.

(3) Method for Imparting Ink Repellent Property by Means of Plasma Treatment

This is a method including, a means for preventing color mixing, subjecting the separating partition wall formed on a substrate to an ink repellent treatment with plasma.

Preferable examples of a gas which contains at least fluorine atoms and is introduced into the plasma treatment include at least one kind of halogen gases selected from $CF_4$, $CHF_3$, $C_2F_6$, $SF_6$, $C_3F_8$ and $C_5F_8$. In particular, $C_5F_8$ (octafluorocyclopentene) is one that the ozone destructive is zero, and the lifetime in air is a very short period of 0.98 year as compared with those of conventional gases ($CF_4$, is 50,000 years, and $C_4F_8$ is 3,200 years). Accordingly, the global warming potential of $C_5F_8$ is 90 (an accumulated value for 100 years when the global warming potential of $CO_2$ is 2), which is much lower than those of the conventional gases ($CF_4$, is 6,500, and $C_4F_8$ is 8,700). Therefore, $C_5F_8$ is extremely effective for protecting the ozone layer and global environment, and it is desirable to use $C_5F_8$ in the invention.

Further, gasses such as that of oxygen, argon, helium or the like may be used as a gas to be introduced in combination therewith, if necessary. In this process, when a mixtured gas of at least one kind of halogen gases selected from $CF_4$, $CHF_3$, $C_2F_6$, $SF_6$, $C_3F_8$ and $C_5F_8$ and $O_2$ gas is used, the degree of the ink repellent property of the separating partition wall surface to be subjected to the plasma treatment can be controlled. In the case that the mixed ratio of $O_2$ exceeds 30%, an oxidation reaction due to $O_2$ becomes predominant, and the effect of an increase in the ink repellent property is suppressed, and damages to the resin becomes noticeable. Accordingly, when the mixed gas is used, the mixed ratio of $O_2$ is preferably in a range of 30% or less.

Further, methods such as a low frequency discharging, a high frequency discharging, a microwave discharging or the like can be used as a method of generating plasma, and conditions such as the pressure, gas flow rate, discharge frequency, processing time or the like can be arbitrarily set.

(4) Method for Coating Ink Repellent Material onto Separating Partition Wall

This is a method including, a means for preventing color mixing, coating the substrate and the surface of the separating partition wall formed on the substrate with a material with an ink repellent property (hereinafter, may be referred to as "ink repellent material").

Among materials that are generally considered as ink repellent materials, materials with a contact angle of 60° or more to a colored liquid composition can be suitably used as the material with an ink repellent property (ink repellent material), without specific limitations. Examples thereof include a fluorine resin such as polytetrafluoroethylene or the like, a silicone rubber, a perfluoroalkylacrylate, a hydrocarbon acrylate, and methyl siloxane.

The ink repellent material may be used for coating as it is by being dissolved or dispersed in a solvent. The coating method can be any method as long as it does not exert an adverse effect to the substrate or the separating partition wall, and can be a method suitable for each material, and can be selected from, for example, a slit coat, a spin coat, a dip coat, a roll coat and the like.

In this method, an $UV.O_3$ treatment can be performed from the surface of the substrate on which a separating partition wall provided on the substrate is not formed (back surface side) through the separating partition wall, so that the ink repellent material on the areas other than the separating partition wall is selectively removed or the areas other than the separating partition wall is selectively hydrophilized (so that the difference between the contact angle to the colorant before the treatment and that after the treatment is made to 30° or more) to perform an ink repellent treatment.

When the removal of the ink repellent material or the hydrophilization treatment is performed, an optimal method of patterning can be selected from dry treatments such as a laser ablation, plasma ashing, corona discharge or the like, and wet treatments using an alkali, which can be selected in accordance with materials to be used.

Further, when an ink repellent material is formed in a pattern shape on the separating partition wall, a lift-off method is effective.

Among the ink repellent treatments (1)-(4) in the above, in view of easiness of the process, it is particularly preferable to impart the ink repellent property by means of the plasma treatment (3).

Substrate with Partition Wall for Color Filter

The substrate with the partition wall for a color filter of the invention is produced by the aforementioned producing methods, and has the partition wall formed on the substrate by pattern-exposing the photosensitive resin layer constituted in the aforementioned manner at an illumination intensity of 50 $mW/cm^2$ or more. Accordingly, when color pixel portions are formed by applying ink droplets (for example, by an inkjet method), ink smudges beyond the separating partition walls and color mixing between adjacent pixel patterns can effectively be prevented, and thus the substrate is effective for forming a color filter with an excellent color hue and a high quality image display.

The partition wall for a color filter is formed by the aforementioned manner, and preferably formed by the transfer method. Each component for constituting the photosensitive resin layer is also the same as that described in the above, and preferable embodiments are also the same as those described in the above. In addition, the height of the partition wall for a color filter, and the optical density are also the same as those described in the above.

Color Filter for Display Element

The color filter for display element of the invention is formed by providing the substrate with partition wall for a color filter of the invention and color pixel portions, and the color pixel portions are formed by applying ink droplets onto recessed portions among partition walls of the substrate with the partition wall for a color filter. Since the color filter of the invention has a partition wall for a color filter, smudges of ink applied by inkjet and color mixing are not caused, and an image display with an excellent color hue and high display quality are possible.

The color pixel portions are formed by applying and entering liquid droplets of colored liquid composition for forming pixels with two or more colors (for example, pixel patterns with three colors of R, G and B) into the recessed portions surrounded by the partition walls formed on the substrate as described above so that the color pixel portions are constituted with plural pixels with two or more colors.

Examples of the method used for applying and entering droplets of the colored liquid composition into the spaces among the separating partition wall include known methods such as an inkjet method, a stripe coating machine coating method, and the inkjet method is preferred in view of cost.

Further, the shape of the separating partition wall may be fixed prior to the formation of pixels, and while the method used therefor is not specifically limited, examples thereof include (1) conducting a re-exposure after development and (2) conducting a heat treatment at a relatively low temperature after development. The heat treatment can be made by heating the substrate with separating partition wall in an electric furnace or a drier, or by irradiating the substrate with light from an infrared lamp.

The exposure amount according to the (1) in the above is 500 to 3,000 $mJ/cm^2$, preferably 1,000 to 2,000 $mJ/cm^2$ in the atmosphere, and the heating temperature according to (2) in the above is 50 to 250° C., preferably about 70 to 200° C., and the heating time is about 10 to 150 minutes. When the temperature is in the above range, the separating partition wall can be cured satisfactorily, and the separating partition wall with a desirable shape can effectively be formed.

Known methods such as a method for curing an ink thermally, a method for photo-curing an ink, or a method for injecting ink droplets onto a transparent receiving layer formed preciously on a substrate, or the like can be used as the inkjet methods for forming color pixel portions with respective colors.

It is preferable to conduct heating (a so-called baking treatment) after formation of color pixel portions. That is, a substrate on which color pixel portions have been formed is heated by using an electric furnace, a drier or the like, or is irradiated with light by using an infrared lamp. While the temperature and the time for the heating vary in accordance with the configuration of the photosensitive resin composition and the thickness of the formed pixel portions, in view of achieving a sufficient solvent resistance, alkali resistance and ultraviolet absorbance, the heating is generally preferably carried out in a range of about 120° C. to about 250° C. for about 10 minutes to 120 minutes.

The pattern shape of the color filter is not specifically limited, and examples thereof include a stripe shape with a common black matrix shape, a grid shape, and further a delta array shape, as shown in FIG. 2.

Inkjet Method

There are various methods such as a method where a charged ink droplets are successively ejected and controlled by an electric field, a method where ink droplets are intermittently ejected by use of a piezoelectric element, or a method where ink droplets are intermittently ejected by utilizing foams formed by heating the ink, which can be used as the inkjet methods for the invention.

The ink to be used may be either an oily ink or a water ink. Either dyes or pigments can be used as a colorant in the ink, and pigments are preferable in view of durability. Color inks used in coating methods (for example, colored resin compositions as described in paragraph [0035] to [0063] of JP-A No. 2005-3861) and inkjet compositions as described in paragraph [0009] to [0026] of JP-A No. 10-195358, which are used for producing known color filters, may be also used in the invention.

Components that can be cured with heat or that can be cured with an energy ray such as ultraviolet ray can be added to the ink, taking into account the processes after application of liquid droplets. The components curable with heat include various thermosetting resins. Examples of the component that is curable with an energy ray include a component in which a photopolymerization initiator is added to an acrylate compound or a methacrylate compound. In particular, components with plural acryloyl groups or methacryloyl groups are contained in a molecule are preferable, taking into account heat resistance. These acrylate compounds and methacrylate compounds are preferably water-soluble, while ones slightly soluble in water can be used by emulsifying thereof. In this case, photosensitive resin compositions formed by the use of the colorants such as pigments as described above can preferably be used.

Further, a thermosetting ink for forming color filter containing at least a binder and bifunctional or trifunctional epoxy monomers is suitable as a preferable ink.

The color filters in the invention are preferably formed of groups composed of color pixel portions with three colors formed by injecting three color inks of R, G and B.

Overcoat Layer

After producing a color filter, an overcoat layer may be formed on the entire surface of the color pixel portions and the separating partition walls, for the purpose of enhancing durability.

The overcoat layer can protect and flatten the color pixel portions and the separating partition walls. However, it is preferable that the overcoat layer is not provided in view of avoiding an increase in production steps.

The overcoat layer can be formed with a resin (an OC agent), and examples of the resin (OC agent) include an acrylic resin composition, an epoxy resin composition, a polyimide resin composition and the like. Among them, acrylic resin compositions are preferable since photocurable resin compositions for color filter generally contains an acrylic resin as a main component and an acrylic resin has an excellent transparency in the visible wavelength range and as an excellent adhesiveness. Examples of overcoat layers include those described in paragraph [0018] to [0028] of JP-A No. 2003-287618, and examples of commercially available overcoat agent include OPTOMER SS6699G (trade name) manufactured by JSR Corporation).

The color filters for display elements of the invention can suitably be used for applications such as TV sets, personal computers, liquid crystal projectors, game machines, mobile terminal equipment such as mobile phones, digital cameras, vehicle navigators or the like, without specific limitations.

Display Device

The display devices of the invention are equipped with the color filter for display element of the invention, and have the partition wall for a color filter produced by the method for producing the partition wall for a color filter of the invention as described above. Since the display device has the partition wall for a color filter, an image display with excellent color hue and a high display quality are possible.

The display devices of the invention include display devices such as liquid crystal display devices, plasma display devices, EL display devices, CRT display devices or the like. The definitions of the devices and descriptions about each device are described, for example, in "Electronic Display Devices" written by Akio Sasaki, published by Kogyo Chosakai Publishing Inc. in 1990, and "Display Devices" written by Sumiaki Ibuki published by Sangyo Tosho Publishing Co. in 1989.

The liquid display devices are described, for example, in "Next Generation Liquid Crystal Display Technology", edited by Tatsuo Uchida, published by Kogyo Chosakai Publishing Inc. in 1994. The forms of the liquid display devices are not specifically limited, and are applicable to liquid display devices in various systems described in the above "Next Generation Liquid Crystal Display Technology". Among them, in particular, the forms of the liquid display devices are effective when applied to liquid display devices with a color TFT system. Liquid display devices with color TFT system are described in, for example, "Color TFT Liquid Display", published by Kyoritsu Publishing Co. Ltd., published in 1996. The liquid crystal display device of the invention can be used to form liquid crystal devices having an expanded view angle by means of a lateral direction electric field drive system such as an IPS, or a pixel dividing system such as an MVA. These systems are described, for example, on page 43 in "Recent Trend of EL, PDP and LCD Display Technologies and Markets thereof", published by Investigation and Research Division of Research Center, Toray, in 2001.

The liquid display devices can be constituted by using, in addition to the color filter, a various known members such as an electrode substrate, a polarization film, a phase difference film, a backlight, spacers, a view angle compensation film or the like. The substrate with partition wall for a color filter and the color filter for liquid display element of the invention can be applicable to liquid display devices constituted by these known members. These members are described in, for example, "Market of Liquid Display-Related Materials and Chemicals in 1994, (Kentaro Shima, published by CMC Co. Ltd. in 1994), and "Present State and Future View of Liquid Crystal Market (Vo. 2) in 2003 (Ryokichi Omote, published by Fuji Chimera Research Institute, Inc. in 2003).

EXAMPLES

Hereinafter, the invention is further explained in detail with reference to examples. However, the invention shall not be limited to the examples unless the invention maintains its spirit. Further, "parts" is parts by mass, unless specifically specified.

Preparation of Deep Color Composition K1

First, a K pigment dispersion 1 and propyleneglycol monomethylether acetate were measured in amounts as described in the following Table 1, mixed at a temperature of 24° C. (±2° C.), and stirred at 150 r.p.m. for 10 minutes. Thereafter, methylethyl ketone, a binder-2, hydroquinone monomethyether, a DPHA liquid, 2,4-bis(trichloromethyl)-6-[4-(N,N-diethoxycarbonylmethyl)amino-3-bromophenyl]-s-triazine and a surfactant 1 were measured in amounts described in Table 1 and added in this order to the above resultant at 25° C. (±2° C.), and mixed and stirred at a temperature of 40° C. (±2° C.), and at 50 r.p.m. for 30 minutes to obtain a deep color composition K1.

TABLE 1

| Deep Color Composition (Components) | K1 |
|---|---|
| K pigment dispersion 1 | 25 |
| Propyleneglycol monomethylether acetate | 8 |
| Methylethyl ketone | 53 |
| Binder-2 | 9.1 |
| DPHA liquid | 4.2 |
| 2,4-bis(trichloromethyl)-6-[4-(N,N-diethoxycarbonylmethyl)amino-3-bromophenyl]-s-triazine | 0.16 |
| Hydroquinone monomethyether | 0.002 |
| Surfactant 1 | 0.044 | parts by mass

Formulation of the K pigment dispersion is shown below.

| | |
|---|---|
| Propyleneglycol monomethylether acetate | 79.53% |
| Carbon black (Nipex35, manufactured by Degussa) | 13.1% |
| Dispersant shown below | 0.65% |
| Polymer (random copolymer of benzylmethacrylate/metrhacrylic acid = 72/28 by molar ratio; molecular weight: 37,000) | 6.72% |
| Dispersant | |

-continued

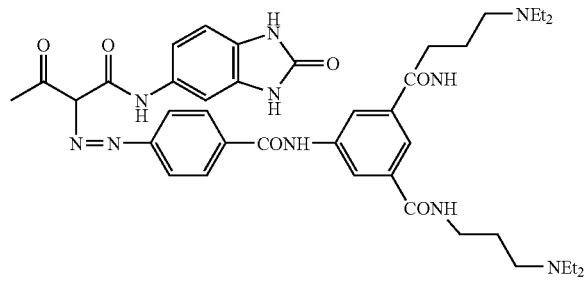

The formulation of the binder-2 is shown below.

| | |
|---|---|
| Polymer (random copolymer of benzylmethacrylate/metrhacrylic acid (= 78/22 by molar ratio) •molecular weight: 37,000 polymer) | 27% |
| Propyleneglycol monomethylether acetate | 73% |
| The formulation of DPHA liquid is shown below. | |
| Dipentaerythritol hexaacrylate (polymerization inhibitor containing 500 ppm of KAYARAD DPHA MEHQ (trade name, manufactured by Nippon Kayaku Co., Ltd.)) | 76% |
| Propyleneglycol monomethylether acetate | 24% |
| The formulation of surfactant 1 is shown below: | |
| Structural component 1 shown below | 30% |
| Methylethyl ketone | 70% |
| Structural component 1 | |

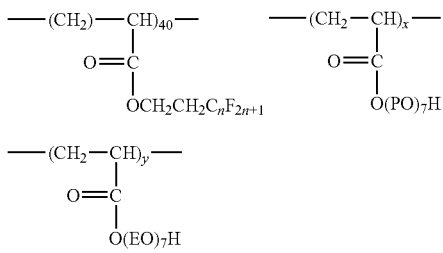

($n = 6$, $x = 55$, $y = 5$, Mw = 33940, Mw/Mn = 2.55
PO: propylene oxide, EO: ethylene oxide)

Example 1

Formation of Separating Partition Wall

After a non-alkali glass substrate (hereinafter, simply referred to as "glass substrate") was washed with a UV washing apparatus, the glass substrate was cleaned with a washing agent by a brush, and further, washed with ultra pure water by means of ultrasonic cleaning. Thereafter, the glass substrate was subjected to a heat treatment at 120° C. for 3 minutes to stabilize the surface condition thereof.

After the glass substrate was cooled, the temperature of the glass substrate was adjusted to 23° C., and was coated with the deep color composition obtained in the above by a glass substrate coater equipped with a slit-like nozzle (trade name: MH-1600, manufactured by F. A. S. Asia Co.). Subsequently, a part of the solvent in the coated layer is removed by drying by use of a vacuum drying device (VCD) (manufactured by Tokyo Ohka Kogyo. Co. Ltd.) for 30 seconds to lose the fluidity of the coated layer, followed by pre-baking at 120° C. for 3 minutes so that a deep color photosensitive resin layer K1 having a layer thickness of 1.8 µm was formed.

The deep color photosensitive resin layer K1 was exposed to light at an exposure amount of 300 mJ/cm$^2$ by use of a proximity type exposure machine with a super high pressure mercury lamp, the distance between the mask surface and the deep color photosensitive resin layer K1 was set to 200 µm in a state where the glass substrate having the deep color photosensitive resin layer K1 thereon and a mask (quartz exposure mask with an image pattern) were vertically upright. At this time, the illumination intensity was measured in advance by placing an illuminometer (UV-M10-S (trade name) manufactured by ORC manufacturing Co., Ltd.) at the exposure focal point to turn out that it was 70 mW/cm$^2$.

Next, after the surface of the deep color photosensitive layer K1 was uniformly dampened by atomizing pure water from a shower nozzle, the deep color photosensitive layer K1 was shower-developed with a 100-fold diluted solution of a KOH type developer (trade name: CDK-1 (containing KOH and a nonionic surfactant) manufactured by Fujifilm Electronics Materials Co., Ltd.) at 23° C. for 80 seconds at a flat nozzle pressure of 0.04 MPa to obtain a patterned image. Subsequently, residues on the deep color photosensitive layer K1 were removed by ejecting ultra pure water from a super high pressure nozzle at a pressure of 9.8 MPa to the patterned image, and the resultant was post-exposed at an exposure amount of 2,000 mJ/cm$^2$ to form a separating partition wall with an optical density of 3.5.

In the above manner, a substrate with a separating partition wall where the separating partition wall was formed on the glass substrate was prepared.

The substrate with a separating partition wall produced in the above manner was cut in a direction perpendicular to the surface of the substrate together with the substrate to expose a cross-sectional surface of the separating partition wall, and the exposed cut surface is directly observed under an optical microscope, and at the same time, photographed under a scanning electron microscope (SEM). The results are shown in Table 2 below. As a result of the observation above, as shown in FIG. 1, when the height of the separating partition wall at the highest point thereof from the surface of the substrate is h, a line parallel to the substrate at the position of 0.8 h from the substrate is $L_1$ and a tangent line at the point where the line $L_1$ contacts the separating partition wall is $L_2$, a line parallel to the substrate at the position of h is $L_3$, the distance from the intersection of $L_2$ and $L_3$ to the separating partition wall is defined as d, h=1.6 µm, d=0.061 µm, and d/h was 0.038.

Plasma Ink Repellent Treatment

Thereafter, using the substrate with the separating partition wall that is formed on the substrate, the separating partition wall was subjected to an ink repellent treatment with plasma by use of a cathode coupling system parallel flat panel type plasma treatment apparatus under the following conditions.

Gas used: CF$_4$
Gas flow rate: 80 sccm
Pressure: 40 Pa:
RF power: 50 W
Treatment time: 30 seconds Preparation of Color Ink for Pixels In the following components, first, a pigment (C.I. Pigment Red 254) and a polymer dispersant (trade name: SOLSPERSE 24000, manufactured by Avecia Inkjet Limited) were mixed with a solvent (ethyl 3-ethoxypropionate), and a pigment dispersion was prepared therefrom by use of three rolls and a beads mill. While the pigment dispersion was sufficiently agitated by a dissolver or the like, a glycidyl methacrylate/styrene copolymer, a first epoxy resin, a second epoxy resin and trimellitic acid were added thereto little by little to prepare a color ink for red (R) pixels.

Formulation of Color Ink for R Pixels

| | |
|---|---|
| Pigment (C.I. Pigment Red 254) | 5 parts |
| Polymer dispersant (trade name: SOLSPERSE 24000 manufactured by Avecia Inkjet Limited) | 1 part |
| Random copolymer of benzylmethacrylae/methacrylic acid (molar ratio of 72/28; molecular weight; 37,000; (binder) | 3 parts |
| First epoxy resin (trade name: EPICOAT 154 manufactured by Yuka Shell Co., Ltd. novolac type epoxy resin) | 2 parts |
| Second epoxy resin (neopentylglycol diglycidylether) | 5 parts |
| Trimellitic acid (hardener) | 4 parts |
| Ethyl 3-ethoxypropionate (solvent) | 80 parts |

Further, a color ink for green (G) pixels was prepared in a manner similar to the preparation of the color ink for R pixels except that C.I. Pigment Red 254 in the above composition was replaced with C.I. Pigment Green 36 in the same amount thereof. In addition, a color ink for blue (B) pixels was prepared in a manner similar to the preparation of the color ink for R pixels except that C.I. Pigment Red 254 in the above composition was replaced with C.I. Pigment Blue 15:6 in the same amount thereof.

Next, using the color inks for R, G or B pixels, each color ink is sequentially ejected from an inkjet head to concave areas separated by the separating partition walls, which was subjected to the ink repellent treatment with plasma, on the substrate with separating partition wall so as to achieve a desired density for each color, so that a color filter constituted by pixel patterns with three colors of R, G and B was formed (hereinafter, referred to as "color filter substrate"). Thereafter, the color filter was placed in an oven of 230° C. and subjected to a baking treatment for 30 minutes to cure the separating partition wall and the pixel pattern as well.

Smudges of each color ink applied by inkjet, color mixing and white deletion in each pixel pattern were evaluated with respect to the obtained color filter substrate under an optical microscope. The each color ink fitted into each recessed portion among the separating partition walls, and none of ink smudges and bleed, color mixing among pixel patterns adjacent to one another, and white deletion in the pattern was observed.

Next, an ITO (indium tin oxide) layer was further formed on the R pixels, G pixels, B pixels and the separating partition walls that constitute the obtained color filter substrate by spattering to from a transparent electrode. Separately, a glass substrate was prepared as a counter substrate, and patterning was conducted on each of the transparent electrode and the counter substrate of the color filter substrate by use of an etching resist for PVA mode.

The resistance value of the transparent electrode (ITO film) of the color filter substrate was measured with a four terminal needle method by use of a resistivity meter (trade name: LORESTA manufactured by Mitsubishi Chemical Corporation), and the value of 12Ω/□ was obtained, which was a low value. It is considered that the value was obtained owing to an improvement of the flatness of the top surface of the separating partition wall formed on the glass substrate.

Next, photospacers were provided on portions positioned above the separating partition walls on the transparent electrode (ITO film) of the color filter substrate, and further, an oriented film made of polyimide was formed on the photospacers. Thereafter, an epoxy resin sealing agent was printed at an outer frame position so as to surround the entire pixel patterns of three colors of R, G and B on the color filter substrate, and a liquid crystal for PVA mode was dropped thereon. After laminating the resultant with the counter substrate, the thus-laminated both substrates were heat-treated to cure the sealing agent to form a liquid crystal cell.

Further, polarization plates (trade name: HLC2-2518 manufactured by Sanritz Corporation) were adhered onto the surfaces of the substrates at the both side of the thus-produced liquid crystal cell. Subsequently, a backlight was formed by using a cold cathode ray tube, and positioned at the rear side of the liquid crystal cell provided with the polarization plate to form a liquid crystal display device.

Example 2

A liquid crystal display element was produced by forming a separating partition wall and a color filter substrate in a manner similar to Example 1, except that the exposure illumination intensity was changed to 300 mW/cm².

In the above, the formed separating partition wall was observed in a manner similar to Example 1, and h=1.8 μm, d=0.064 μm, and d/h=0.035 were obtained. The results are shown in Table 2. It is noted that a separating partition wall with a high flatness at the top surface thereof was obtained similarly to Example 1. Furthermore, smudges of each color ink applied by inkjet, color mixing and white deletion in each pixel pattern with respect to the obtained color filter substrate were evaluated under an optical microscope in a manner similar to Example 1. The each color ink completely fitted into each recessed portion among the separating partition walls, and none of ink smudges and bleed, color mixing among pixel patterns adjacent to one another, and white deletion in the pattern was observed. In addition, the resistance value of the transparent electrode (ITO film) measured in a manner similar to Example 1 was 11Ω/□, which was a low value. It is considered that the value was obtained due to an improvement of the flatness of the top surface of the separating partition wall.

Example 3

Except that the proximity type exposure machine equipped with a super high pressure mercury lamp in Example 1 was replaced with a scanning type exposure machine equipped with a laser light source, a separating partition wall was formed, a color filter substrate was produced, and a liquid crystal display element was produced in a manner similar to Example 1. At this time, the illumination intensity measured in advance by placing an illuminometer at the exposure focal point was 2,200 mW/cm².

In the above, the formed separating partition wall was observed in a manner similar to Example 1, and h=1.8 μm, d=0.045 μm, and d/h=0.025 were obtained. The results are shown in Table 2. Further, a separating partition wall with a high flatness at the top surface thereof could be obtained similarly to Example 1. Furthermore, smudges of each color ink applied by inkjet, color mixing and white deletion in each pixel pattern with respect to the obtained color filter substrate were evaluated under an optical microscope in a manner similar to Example 1. The each color ink completely fitted into each recessed portion among the separating partition walls, and none of ink smudges and bleed, color mixing among pixel patterns adjacent to one another, and white deletion in the pattern was observed. In addition, the resistance value of the transparent electrode (ITO film) measured in a manner similar to Example 1 was 8Ω/□, which was a low value. It is considered that the value was obtained due to an improvement of the flatness of the top surface of the separating partition wall.

Example 4

Preparation of Deep Color Photosensitive Transfer Material K1

A coating solution with the following formulation H1 for a thermoplastic resin layer was coated on a polyethylene terephthalate temporary support (PET temporary support) having a thickness of 75 μm by means of a slit-like nozzle, and the coated layer was dried to form a thermoplastic resin layer. Next, a coating solution with the following formulation P1 for an intermediate layer was further coated on the thermoplastic resin layer, and the coated layer was dried to laminate an intermediate layer on the thermoplastic resin layer. Subsequently, the deep color composition K1 prepared in Example 1 was coated on the intermediate layer and the coated layer was dried to laminate a black deep color photosensitive layer thereon.

As described above, a thermoplastic resin layer having a dry layer thickness of 14.6 μm, an intermediate layer having a dry layer thickness of 1.6 μm, and a deep color photosensitive layer having a dry layer thickness of 2 μm were formed on the PET temporary support. A protective film (polypropylene film with a thickness of 12 μm) was attached onto the surface of the deep color photosensitive layer in a pressurizing manner to form a deep color photosensitive transfer material having a lamination structure of a temporary support/thermoplastic resin layer/intermediate layer/deep color photosensitive layer. Hereinafter, the material is referred to as a deep color photosensitive transfer material K1.

Formulation H1 of Coating Solution for Thermoplastic Resin Layer

| | |
|---|---|
| Methanol | 11.1 parts |
| Propyleneglycol monomethy lacetate | 6.36 parts |
| Methylethyl ketone | 52.4 parts |
| Copolymer of methylmethacrylate/2-ethylhexylacrylate/benzylmethacrylate/methacrylic acid (copolymerization ratio (molar ratio) = 55/11.7/4.5/28.8; molecular weight = 100,000; Tg ≈ 70° C.) | 5.38 parts |
| Copolymer of styrene/acrylic acid (copolymerization ratio (molar ratio) = 63/37; average molecular weight = 10,000; Tg ≈ 100° C.) | 13.6 parts |
| 2,2-bis[4-(methacryloxypolyethoxy)phenyl]propane (manufactured by Shin-Nakamura Chemical Industries Co., Ltd.) | 9.1 parts |
| Surfactant 1 shown above | 0.54 parts |
| Formulation P1 of coating solution for intermediate layer | |
| PVA-205 (manufactured by Kuraray Co., Ltd. saponification degree = 88%; polymerization degree; 550; polyvinyl alcohol) | 32.2 parts |
| Polyvinyl pyrrolidone (manufactured by ISP Japan; K-30) | 14.9 parts |
| distilled water | 524 parts |
| Methanol | 429 parts |

Formation of Separating Partition Wall

A non-alkali glass substrate (hereinafter, simply referred to as "glass substrate") was washed with rotating brush having nylon bristles while spraying a glass cleaner regulated at a temperature of 25° C. with a shower for 20 seconds, and after the glass substrate was washed with pure water shower, a silane coupling liquid (an aqueous solution containing 0.3% by mass of N-β(aminoethyl)γ-aminopropyl trimethoxysilane (trade name; KBM603 manufactured by Shin-Etsu Chemical Co., Ltd.)) was sprayed for 20 seconds, and the glass substrate was washed with pure water shower. Thereafter, the substrate was heated by means of a substrate pre-heating apparatus at 100° C. for 2 minutes.

The protective film was stripped off and removed from the deep color photosensitive transfer material K1 obtained in the above, and the surface of the deep color photosensitive layer revealed by the removal was superposed on the surface of the glass substrate after the silane coupling treatment so as to be contacted with each other to be laminated by use of a laminator (trade name: LAMIC II manufactured by Hitachi Industries Co., Ltd.) under the condition of a rubber roller temperature of 130° C., a linear pressure of 100 N/cm, and a transport velocity of 2.2 m/minute.

Thereafter, the PET temporary support was stripped off from the thermoplastic resin layer at the interface therebetween and removed. After the removal of the temporary support, the deep color photosensitive resin layer was pattern-exposed to light at an exposure amount of 70 mJ/cm$^2$ by the use of a proximity type exposure machine with a super high pressure mercury lamp in a state where the substrate and a mask (quartz exposure mask with an image pattern) were vertically upright, the distance between the mask surface and the deep color photosensitive resin layer was set to 200 μm. At this time, the illumination intensity was in advance measured by placing an illuminometer at the exposure focal point, and turned out to 60 mW/cm$^2$.

Next, unexposed areas of the deep color photosensitive layer, the intermediate layer and the thermoplastic resin layer were developed and removed with the use of a 100-fold diluted solution of a KOH type developer (trade name: CDK-1 (containing KOH and a nonionic surfactant) manufactured by Fujifilm Electronics Materials Co., Ltd.), and a black pattern on the glass substrate was obtained. Subsequently, the entire surface of the glass substrate was post-exposed from the side of the glass substrate, on which the separating partition wall is formed, with applying 2,000 mJ/cm$^2$ by use of an aligner in the atmosphere, to form a separating partition wall with an optical density of 3.6.

The shape of the separating partition wall thus obtained was observed in a manner similar to Example 1, and h=1.7 μm, d=0.045 μm, and d/h=0.026 were obtained. The results are shown in Table 2. Further, a separating partition wall with a high flatness at the top surface thereof was obtained similarly to Example 1.

Ink Repellent Treatment by Method for Coating Ink Repellent Material

An alkali-soluble photosensitive resin (positive work photoresist: AZP4210 (trade name, manufactured by Hoechst Japan Limited)), in which a fluorine surfactant (FLUORAD FC-430 (trade name, manufactured by Sumitomo 3M Limited)) was previously internally added in an amount of 5% by mass with respect to the solid content of the above photosensitive resin, was coated on the surface of the glass substrate on which a separating partition wall was formed in a layer thickness of 2 μm by use of a slit-like nozzle, and the resin layer was subjected to a heat treatment at 90° C. for 30 minutes in a hot air circulation drier. Then, the resin layer was exposed to light from the side (rear side) of the glass substrate, on which the separating partition wall was not formed, through the separating partition wall at an exposure amount of 110 mJ/cm$^2$ (38 mW/cm$^2$×2.9 seconds), and immersed and shaken in an inorganic alkali developer (trade name: AZ400K DEVELOPER, manufactured by Hoechst Japan Limited; 1:4) for 80 seconds, and rinsed with pure water for 30 to 60 second to form an ink repellent resin layer on the separating partition on the glass substrate (ink repellent treatment in the aforementioned (4)). At this time, a difference of surface energy was caused between the outside and the inside of the recessed portion surrounded by the separating partition wall.

With respect to the surface energies of the pixel forming area and the separating partition wall after the water repellent resin layer was formed, the surface energy was 10-15 dyne/cm on the separating partition wall (water repellent resin layer), and the surface energy was approximately 55 dyne/cm on the pixel forming area (glass substrate), respectively.

Next, a color filter substrate was produced, and a liquid crystal display element was produced in a manner similar to Example 1.

Smudges of each color ink applied by inkjet, color mixing and white deletion in each pixel pattern with respect to the obtained color filter substrate were evaluated in a manner similar to Example 1. The each color ink completely fitted into each recessed portion among the separating partition walls, and none of ink smudges and bleed, color mixing among pixel patterns adjacent to one another, and white deletion in the pattern was observed. In addition, the resistance value of the transparent electrode (ITO film) measured in a manner similar to Example 1 was 9Ω/□, which was a low value. It is considered that the value was obtained owing to an improvement of the flatness of the top surface of the separating partition wall.

Example 5

A separating partition wall was produced, a color filter substrate was produced, and a liquid crystal display element was produced in a manner similar to Example 4, except that a deep color photosensitive transfer material was prepared without providing the intermediate layer.

In the above, the formed separating partition wall was observed in a manner similar to Example 1, and h=1.5 μm, d=0.053 μm, and d/h=0.036 were obtained. The results are shown in Table 2. Further, a separating partition wall with a high flatness at the top surface thereof could be obtained similarly to Example 1. Furthermore, smudges of each color ink applied by inkjet, color mixing and white deletion in each pixel pattern with respect to the obtained color filter substrate were evaluated under an optical microscope in a manner similar to Example 1. The each color ink completely fitted into each recessed portion among the separating partition walls, and none of ink smudges and bleed, color mixing among pixel patterns adjacent to one another, and white deletion in the pattern was observed. In addition, the resistance value of the transparent electrode (ITO film) measured in a manner similar to Example 1 was 10Ω/□, which was a low value. It is considered that the value was obtained owing to an improvement of the flatness of the top surface of the separating partition wall.

Comparative Example 1

A separating partition wall was formed, a separating partition wall was produced, a color filter substrate was produced, and a liquid crystal display element was produced in a manner similar to Example 1, except for changing the exposure illumination intensity to 40 mW/cm². The optical density of the formed separating partition wall was 3.6.

In the above, the formed separating partition wall was observed in a manner similar to Example 1, and h=1.7 μm, d=0.14 μm, and d/h=0.082 were obtained. The results are shown in Table 2. Further, a separating partition wall with a high flatness at the top surface thereof was obtained similarly to Example 1. Furthermore, the smudges of each color ink applied by inkjet, color mixing and white deletion in each pixel pattern with respect to the obtained color filter substrate were evaluated under an optical microscope in a manner similar to Example 1. It was found that the ink got over the separating partition wall, and color mixing occurred among pixel patterns adjacent to one another. In addition, the resistance value of the transparent electrode (ITO film) measured in a manner similar to Example 1 was 22Ω/□. The flatness of the top surface of the separating partition wall was not sufficiently high.

TABLE 2

| | Illumination Intensity (mW/cm²) | h (μm) | d (μm) | d/h | Resistance Value (Ω/□) | Color Mixing With Adjacent Pixels |
|---|---|---|---|---|---|---|
| Example 1 | 70 | 1.6 | 0.061 | 0.038 | 12 | None |
| Example 2 | 300 | 1.8 | 0.064 | 0.035 | 11 | None |
| Example 3 | 2200 | 1.8 | 0.045 | 0.025 | 8 | None |
| Example 4 | 60 | 1.7 | 0.045 | 0.026 | 9 | None |
| Example 5 | 60 | 1.5 | 0.053 | 0.036 | 10 | None |
| Comparative Example 1 | 40 | 1.7 | 0.014 | 0.082 | 22 | Observed |

As shown in Table 2, in Examples, the separating partition wall formed in a rectangular cross-sectional shape has a sharp corner portion (edge) that is not in contact with the substrate and has a high flatness in the top surface of the separating partition wall. The smudges and bleed of ink injected and applied, color mixing among pixel patterns adjacent to one another, and occurrence of white deletion in the pattern could be prevented. In contrast, in Comparative Example, the corner portion (edge) that is not in contact with the substrate became round, and ink smudges and bleed, color mixing and white deletion in the pattern occurred.

EXPLANATIONS OF NUMERALS

1 Separating partition wall
2 Substrate

The invention claimed is:

1. A method for producing a partition wall for a color filter comprising:
   forming a photosensitive resin layer comprising a radical polymerizable monomer, a photopolymerization initiator, a binder and a colorant on at least one surface of a substrate; and
   exposing the photosensitive resin layer to light at an illumination intensity of 50 mW/cm² or more in a pattern shape and developing the photosensitive resin layer to remove an unexposed area of the photosensitive resin layer to form a cured partition wall.

2. The method for producing a partition wall for a color filter according to claim 1, wherein the light source for the exposure is a laser light.

3. The method for producing a partition wall for a color filter according to claim 1, further comprising ink repellency treating to impart an ink-repelling property to at least a portion of the partition wall pattern.

4. The method for producing a partition wall for a color filter according to claim 2, further comprising ink repellency treating to impart an ink-repelling property to at least a portion of the partition wall pattern.

5. The method for producing a partition wall for a color filter according to claim 3, wherein the ink repellency treating comprises a plasma treatment.

6. The method for producing a partition wall for a color filter according to claim 4, wherein the ink repellency treating comprises a plasma treatment.

7. The method for producing a partition wall for a color filter according to claim 1, wherein an optical density of the photosensitive resin layer is in a range of from 2.0 to 10.0.

8. The method for producing a partition wall for a color filter according to claim 1, wherein the photosensitive resin layer comprises a black colorant.

9. A substrate having a partition wall for a color filter produced by a method comprising:
    forming a photosensitive resin layer comprising a radical polymerizable monomer, a photopolymerization initiator, a binder and a colorant on at least one surface of a substrate; and
    exposing the photosensitive resin layer to light at an illumination intensity of 50 mW/cm$^2$ or more in a pattern shape and developing the photosensitive resin layer to remove an unexposed area of the photo sensitive resin layer to form a cured partition wall.

10. A method for producing a color filter for a display element comprising a substrate with a partition wall for a color filter and color pixel portions, the method comprising:
    forming a photosensitive resin layer comprising a radical polymerizable monomer, a photopolymerization initiator, a binder and a colorant on at least one surface of a substrate;
    exposing the photosensitive resin layer to light at an illumination intensity of 50 mW/cm$^2$ or more in a pattern shape and developing the photosensitive resin layer to remove an unexposed area of the photo sensitive resin layer to form a cured partition wall; and
    applying, by an inkjet process, liquid droplets into recessed portions among the cured partition walls on the substrate having partition walls for a color filter, to form the color pixel portions.

11. A color filter for a display element comprising a substrate with partition walls for a color filter and color pixel portions,
    wherein the substrate with partition walls for a color filter is produced by a method comprising:
    forming a photosensitive resin layer comprising a radical polymerizable monomer, a photopolymerization initiator, a binder and a colorant on at least one surface of a substrate; and
    exposing the photosensitive resin layer to light at an illumination intensity of 50 mW/cm$^2$ or more in a pattern shape and developing the photosensitive resin layer to remove an unexposed area of photo sensitive resin layer to form a cured partition wall, and
    wherein the color pixel portions are produced by a method comprising applying, by an inkjet process, liquid droplets into recessed portions among the cured partition walls on the substrate having partition walls for a color filter.

12. A display device with a color filter for a display element,
    wherein the color filter for display element comprises: a substrate with partition walls for a color filter; and color pixel portions,
    the substrate with partition walls for a color filter is produced by a method comprising:
    forming a photosensitive resin layer comprising a radical polymerizable monomer, a photopolymerization initiator, a binder and a colorant on at least one surface of a substrate; and
    exposing the photosensitive resin layer to light at an illumination intensity of 50 mW/cm$^2$ or more in a pattern shape and developing the photosensitive resin layer to remove an unexposed area of the photo sensitive resin layer to form a cured partition, and
    wherein the color pixel portions are produced by a method comprising applying, by an inkjet process, liquid droplets into recessed portions among partition walls on the substrate having partition walls for a color filter.

* * * * *